United States Patent
Ng et al.

(10) Patent No.: US 12,387,270 B2
(45) Date of Patent: *Aug. 12, 2025

(54) SYNTHETIC DIVERSITY ANALYSIS WITH ACTIONABLE FEEDBACK METHODOLOGIES

(71) Applicant: Guidewire Software, Inc., Foster City, CA (US)

(72) Inventors: George Y. Ng, San Mateo, CA (US); Yoshifumi Yamamoto, Palo Alto, CA (US); Brian Wu, San Francisco, CA (US); Siddharth R. Ramakrishnan, Pleasanton, CA (US)

(73) Assignee: Guidewire Software, Inc., San Mateo, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 15/660,822

(22) Filed: Jul. 26, 2017

(65) Prior Publication Data
US 2019/0035027 A1    Jan. 31, 2019

(51) Int. Cl.
*G06Q 40/08*    (2012.01)
*H04L 9/40*    (2022.01)

(52) U.S. Cl.
CPC ......... *G06Q 40/08* (2013.01); *H04L 63/1433* (2013.01); *H04L 63/20* (2013.01)

(58) Field of Classification Search
CPC ...... G06Q 40/08; G06Q 10/00; G06Q 50/188; G06Q 10/0635; G06F 16/289
See application file for complete search history.

(56) References Cited

U.S. PATENT DOCUMENTS 5,243,428 A * 9/1993 Challapali ............... H04N 7/08
348/610
5,535,383 A * 7/1996 Gower ............... G06F 16/289
(Continued)

FOREIGN PATENT DOCUMENTS

EP    3675455 A1 * 7/2020 ............. H04L 63/02
JP    2006295910 A * 10/2006
(Continued)

OTHER PUBLICATIONS

Santos et. al, "Method of Automated Cyber risk assessment insurance underwriting and remediation" Cisco systems (2017) (Year: 2017).*

(Continued)

*Primary Examiner* — Daniel S Felten
(74) *Attorney, Agent, or Firm* — Van Pelt, Yi & James LLP

(57) ABSTRACT

Various embodiments disclosed include, for each entity in a portfolio, receiving entity data indicative of attributes of an entity, determining the received entity data for at least some entities is missing a portion of the entity data required to perform a cyber risk analysis; and synthesizing the missing portion. The method may further include comparing the received entity data and synthesized missing portion for each of the entities to each other; locating clusters of similar entity data shared between two or more of the entities; and calculating a cyber risk score representing how different the entities are to one another based on the entity data that are not shared between entities. Some embodiments include comparing entities that are missing some entity data to entities which have complete entity data, and generating a synthesized portfolio by selecting entities having complete entity data to replace the entities that are missing entity data.

6 Claims, 19 Drawing Sheets

(56) References Cited

U.S. PATENT DOCUMENTS

| | | | |
|---|---|---|---|
| 5,754,973 A * | 5/1998 | Akune | G10H 1/16 |
| | | | 704/226 |
| 5,920,861 A * | 7/1999 | Hall | G06F 21/10 |
| 5,949,876 A * | 9/1999 | Ginter | G06F 21/10 |
| | | | 348/E5.006 |
| 5,987,440 A * | 11/1999 | O'Neil | G06Q 10/10 |
| | | | 705/39 |
| 6,269,349 B1 | 7/2001 | Aieta | G06Q 50/188 |
| | | | 705/80 |
| 6,374,358 B1 | 4/2002 | Townsend | |
| 6,839,689 B2 * | 1/2005 | Aieta | G06Q 50/188 |
| | | | 705/51 |
| 6,980,927 B2 * | 12/2005 | Tracy | G06F 21/577 |
| | | | 702/181 |
| 7,047,419 B2 * | 5/2006 | Black | G06Q 20/40145 |
| | | | 713/186 |
| 7,324,952 B2 | 1/2008 | Hisano | |
| 7,680,659 B2 * | 3/2010 | Gao | G10L 15/197 |
| | | | 704/236 |
| 7,711,646 B2 | 5/2010 | Cianciarulo et al. | |
| 8,332,242 B1 | 12/2012 | Medina, III | |
| 8,448,245 B2 | 5/2013 | Banerjee et al. | |
| 8,468,599 B2 | 6/2013 | McCusker et al. | |
| 8,484,066 B2 * | 7/2013 | Miller | G06Q 10/0635 |
| | | | 705/7.28 |
| 8,494,955 B2 * | 7/2013 | Quarterman | G06Q 40/08 |
| | | | 705/38 |
| 8,577,775 B1 | 11/2013 | Gerber | |
| 8,601,587 B1 * | 12/2013 | Powell | G06F 21/552 |
| | | | 726/25 |
| 8,699,767 B1 | 4/2014 | Khosla et al. | |
| 8,744,894 B2 | 6/2014 | Christiansen | |
| 8,973,088 B1 | 3/2015 | Leung et al. | |
| 9,027,125 B2 * | 5/2015 | Kumar | H04L 63/0209 |
| | | | 709/224 |
| 9,031,951 B1 | 5/2015 | Baluja et al. | |
| 9,043,905 B1 | 5/2015 | Allen | |
| 9,100,430 B1 * | 8/2015 | Seiver | H04L 63/1433 |
| 9,241,008 B2 * | 1/2016 | Powell | G06F 21/577 |
| 9,253,203 B1 | 2/2016 | Ng | |
| 9,292,881 B2 | 3/2016 | Alperovitch et al. | |
| 9,367,694 B2 * | 6/2016 | Eck | G06F 21/55 |
| 9,373,144 B1 | 6/2016 | Ng et al. | |
| 9,471,777 B1 | 10/2016 | Juels | |
| 9,521,160 B2 * | 12/2016 | Ng | G06Q 40/06 |
| 9,613,442 B2 * | 4/2017 | Pan | G06T 11/005 |
| 9,646,428 B1 | 5/2017 | Konrardy et al. | |
| 9,699,209 B2 | 7/2017 | Ng et al. | |
| 9,715,711 B1 | 7/2017 | Konrardy | |
| 9,893,970 B2 * | 2/2018 | Gauvin | H04L 63/04 |
| 9,894,036 B2 | 2/2018 | Weinberger | |
| 10,050,989 B2 * | 8/2018 | Ng | H04L 63/1433 |
| 10,050,990 B2 * | 8/2018 | Ng | H04L 63/1433 |
| 10,099,297 B2 * | 10/2018 | Lemmer | B23B 51/009 |
| 10,102,589 B1 | 10/2018 | Tofte | |
| 10,230,764 B2 * | 3/2019 | Ng | G06N 20/00 |
| 10,326,786 B2 | 6/2019 | Gladstone | |
| 10,404,737 B1 * | 9/2019 | Sweeney | G06F 16/2228 |
| 10,404,748 B2 * | 9/2019 | Parthasarathi | |
| 10,498,757 B2 * | 12/2019 | Pickles | H04L 63/1433 |
| 10,574,539 B2 | 2/2020 | Brown | |
| 10,656,993 B2 * | 5/2020 | Thatcher | G11C 29/52 |
| 2002/0026335 A1 | 2/2002 | Honda | |
| 2002/0091551 A1 | 7/2002 | Parisi | |
| 2003/0014342 A1 | 1/2003 | Vande Pol | |
| 2003/0014344 A1 | 1/2003 | Chacko et al. | |
| 2003/0028803 A1 * | 2/2003 | Bunker | H04L 43/00 |
| | | | 726/4 |
| 2003/0040942 A1 | 2/2003 | Hooten | |
| 2003/0084349 A1 | 5/2003 | Friedrichs et al. | |
| 2003/0126049 A1 | 7/2003 | Nagan et al. | |
| 2003/0135758 A1 | 7/2003 | Turner | |
| 2003/0154393 A1 | 8/2003 | Young | |
| 2003/0236990 A1 | 12/2003 | Hrastar et al. | |
| 2004/0006532 A1 | 1/2004 | Lawrence et al. | |
| 2004/0010709 A1 | 1/2004 | Baudoin et al. | |
| 2004/0024693 A1 | 2/2004 | Lawrence | |
| 2004/0049698 A1 | 3/2004 | Ott et al. | |
| 2004/0064726 A1 | 4/2004 | Girouard | |
| 2004/0167793 A1 * | 8/2004 | Masuoka | G06Q 40/00 |
| | | | 709/224 |
| 2004/0260945 A1 | 12/2004 | Raikar et al. | |
| 2005/0015624 A1 | 1/2005 | Ginter et al. | |
| 2005/0044418 A1 | 2/2005 | Miliefsky | |
| 2005/0096944 A1 * | 5/2005 | Ryan | G06Q 40/08 |
| | | | 705/4 |
| 2005/0097320 A1 * | 5/2005 | Golan | G06F 21/40 |
| | | | 713/166 |
| 2005/0131828 A1 * | 6/2005 | Gearhart | G06Q 40/08 |
| | | | 705/50 |
| 2005/0132225 A1 * | 6/2005 | Gearhart | G06F 21/577 |
| | | | 726/4 |
| 2005/0261943 A1 | 11/2005 | Quarterman et al. | |
| 2005/0278786 A1 | 12/2005 | Tippett et al. | |
| 2006/0020814 A1 | 1/2006 | Lieblich | |
| 2006/0062443 A1 * | 3/2006 | Basu | G06T 11/005 |
| | | | 382/274 |
| 2006/0184473 A1 | 8/2006 | Eder | |
| 2006/0265746 A1 | 11/2006 | Farley et al. | |
| 2007/0005680 A1 | 1/2007 | Jrad | |
| 2007/0180490 A1 | 8/2007 | Renzi | |
| 2007/0192867 A1 | 8/2007 | Miliefsky | |
| 2007/0294118 A1 | 12/2007 | Tait et al. | |
| 2007/0298720 A1 | 12/2007 | Wolman | |
| 2008/0016563 A1 | 1/2008 | McConnell et al. | |
| 2008/0047016 A1 | 2/2008 | Spoonamore | |
| 2008/0162377 A1 | 7/2008 | Pinkas | |
| 2008/0167920 A1 | 7/2008 | Schmidt et al. | |
| 2008/0250064 A1 | 10/2008 | Duchon et al. | |
| 2008/0280637 A1 | 11/2008 | Shaffer | |
| 2009/0024663 A1 | 1/2009 | McGovern | |
| 2009/0037323 A1 | 2/2009 | Feinstein | |
| 2009/0063365 A1 | 3/2009 | Pinkas | |
| 2009/0126018 A1 | 5/2009 | Keohane | |
| 2009/0271063 A1 | 10/2009 | Govindavajhala | |
| 2009/0319342 A1 | 12/2009 | Shilman et al. | |
| 2010/0046553 A1 | 2/2010 | Daigle | |
| 2010/0114634 A1 | 5/2010 | Christiansen et al. | |
| 2010/0153156 A1 | 6/2010 | Guinta | |
| 2010/0205014 A1 * | 8/2010 | Sholer | G06Q 10/00 |
| | | | 705/4 |
| 2010/0229187 A1 | 9/2010 | Marwah et al. | |
| 2011/0036909 A1 * | 2/2011 | Berkun | G06K 1/18 |
| | | | 347/3 |
| 2011/0078073 A1 | 3/2011 | Annappindi | |
| 2011/0154497 A1 | 6/2011 | Bailey, Jr. | |
| 2011/0161116 A1 * | 6/2011 | Peak | G01C 21/36 |
| | | | 705/4 |
| 2011/0239267 A1 | 9/2011 | Lyne | |
| 2011/0244798 A1 | 10/2011 | Daigle | |
| 2011/0277034 A1 * | 11/2011 | Hanson | H04L 63/1433 |
| | | | 726/25 |
| 2011/0289597 A1 | 11/2011 | Hinds | |
| 2011/0295722 A1 | 12/2011 | Reisman | |
| 2011/0313930 A1 | 12/2011 | Bailey, Jr. | |
| 2012/0011077 A1 | 1/2012 | Bhagat | |
| 2012/0041790 A1 | 2/2012 | Koziol | |
| 2012/0046989 A1 | 2/2012 | Baikalov et al. | |
| 2012/0059779 A1 | 3/2012 | Syed et al. | |
| 2012/0079598 A1 | 3/2012 | Brock | |
| 2012/0089617 A1 | 4/2012 | Frey | |
| 2012/0096558 A1 | 4/2012 | Evrard | |
| 2012/0159624 A1 | 6/2012 | König | |
| 2012/0215575 A1 | 8/2012 | Deb et al. | |
| 2012/0239438 A1 | 9/2012 | Hemmings | |
| 2012/0284158 A1 | 11/2012 | Kovac | |
| 2012/0300975 A1 | 11/2012 | Chalamala et al. | |
| 2013/0055404 A1 | 2/2013 | Khalili | |
| 2013/0073473 A1 | 3/2013 | Heath | |
| 2013/0104236 A1 | 4/2013 | Ray | |
| 2013/0188475 A1 | 7/2013 | Lim et al. | |
| 2013/0191829 A1 | 7/2013 | Shimokawa et al. | |

(56) References Cited

U.S. PATENT DOCUMENTS

| | | | |
|---|---|---|---|
| 2013/0218670 A1* | 8/2013 | Spears | G06Q 30/0248 |
| | | | 705/14.47 |
| 2013/0239167 A1 | 9/2013 | Sreenivas et al. | |
| 2013/0239168 A1 | 9/2013 | Sreenivas et al. | |
| 2013/0239177 A1 | 9/2013 | Sigurdson et al. | |
| 2013/0283336 A1 | 10/2013 | Macy et al. | |
| 2013/0346328 A1 | 12/2013 | Agle et al. | |
| 2013/0347060 A1 | 12/2013 | Hazzani | |
| 2014/0007190 A1 | 1/2014 | Alperovitch et al. | |
| 2014/0019171 A1 | 1/2014 | Koziol | |
| 2014/0067713 A1 | 3/2014 | Gerber | |
| 2014/0067716 A1 | 3/2014 | Gerber | |
| 2014/0122163 A1 | 5/2014 | Simpson | |
| 2014/0137257 A1* | 5/2014 | Martinez | H04L 63/1433 |
| | | | 726/25 |
| 2014/0142988 A1 | 5/2014 | Grosso et al. | |
| 2014/0181982 A1 | 6/2014 | Guo | |
| 2014/0200930 A1 | 7/2014 | Zizzamia et al. | |
| 2014/0215621 A1 | 7/2014 | Xaypanya | |
| 2014/0257917 A1 | 9/2014 | Spencer | |
| 2014/0257918 A1 | 9/2014 | Spencer | |
| 2014/0328179 A1 | 11/2014 | Kabakura | |
| 2014/0379708 A1 | 12/2014 | Fox | |
| 2015/0088595 A1 | 3/2015 | Chillar et al. | |
| 2015/0095206 A1* | 4/2015 | Van Heerden | G06Q 40/00 |
| | | | 705/35 |
| 2015/0100442 A1* | 4/2015 | Van Heerden | G06Q 20/327 |
| | | | 705/16 |
| 2015/0100443 A1* | 4/2015 | Van Heerden | G06Q 20/227 |
| | | | 705/16 |
| 2015/0106260 A1 | 4/2015 | Andrews | |
| 2015/0188949 A1* | 7/2015 | Mahaffey | H04W 12/37 |
| | | | 726/1 |
| 2015/0269383 A1 | 9/2015 | Lang | |
| 2015/0271142 A1 | 9/2015 | Oliphant | |
| 2015/0324559 A1 | 11/2015 | Boss | |
| 2015/0331932 A1* | 11/2015 | Georges | G06T 11/206 |
| | | | 382/225 |
| 2015/0341389 A1 | 11/2015 | Kurakami | |
| 2015/0373043 A1 | 12/2015 | Wang et al. | |
| 2015/0379488 A1 | 12/2015 | Ruff | |
| 2015/0381662 A1 | 12/2015 | Nair | |
| 2016/0099963 A1 | 4/2016 | Mahaffey | |
| 2016/0148332 A1 | 5/2016 | Stibel | |
| 2016/0155066 A1* | 6/2016 | Drame | G06N 20/00 |
| | | | 706/12 |
| 2016/0162924 A1 | 6/2016 | Rathod | |
| 2016/0189301 A1 | 6/2016 | Ng et al. | |
| 2016/0197953 A1 | 7/2016 | King-Wilson | |
| 2016/0205138 A1 | 7/2016 | Krishnaprasad | |
| 2016/0212169 A1 | 7/2016 | Knjazihhin et al. | |
| 2016/0234247 A1 | 8/2016 | Ng et al. | |
| 2016/0248799 A1 | 8/2016 | Ng et al. | |
| 2016/0248800 A1 | 8/2016 | Ng et al. | |
| 2016/0294854 A1 | 10/2016 | Parthasarathi et al. | |
| 2016/0306979 A1 | 10/2016 | Kotler | |
| 2017/0085595 A1 | 3/2017 | Ng et al. | |
| 2017/0093904 A1 | 3/2017 | Ng et al. | |
| 2017/0093905 A1* | 3/2017 | Ng | G06Q 40/06 |
| 2017/0116552 A1 | 4/2017 | Deodhar et al. | |
| 2017/0142140 A1* | 5/2017 | Muddu | H04L 63/1416 |
| 2017/0187745 A1 | 6/2017 | Ng et al. | |
| 2018/0025157 A1* | 1/2018 | Titonis | H04W 12/128 |
| | | | 726/22 |
| 2018/0359276 A1* | 12/2018 | Ng | G06Q 40/06 |
| 2019/0035027 A1* | 1/2019 | Ng | G06Q 40/08 |
| 2021/0358046 A1 | 11/2021 | Roll | |
| 2022/0245727 A1 | 8/2022 | Roll | |

FOREIGN PATENT DOCUMENTS

| | | |
|---|---|---|
| TW | 201636937 A | 10/2016 |
| WO | WO2014036396 A1 | 3/2014 |
| WO | WO2016109162 A1 | 7/2016 |
| WO | WO2016109608 A1 | 7/2016 |
| WO | WO2017078986 A1 | 5/2017 |

OTHER PUBLICATIONS

Martin Salois, "Password Complexity Recommendations", Defense Research and Development Canada, Oct. 2014, pp. 1-34.

Scarfone et al. NIST Special Publication 800-118. "Guide to Enterprise Password Management (Draft)", Apr. 2009, NIST (National Institute of Standards and Technology), pp. 1-40.

U.S. Appl. No. 14/614,897, filed Feb. 5, 2015.

"International Search Report" & "Written Opinion," Patent Cooperation Treaty Application No. PCT/US2015/065365, Feb. 10, 2016, 11 pages.

Böhme et al., "Models and Measures for Correlation in Cyber-Insurance," Workshop on the Economics of Information Security (WEIS), Jun. 2006, Retrieved from the Internet: <URL:http://www.econinfosec.org/archive/weis2006/docs/16.pdf>, 26 pages.

"International Search Report" & "Written Opinion," Patent Cooperation Treaty Application No. PCT/US2015/067968, Feb. 26, 2016, 11 pages.

Raftery, Adrian et al., "Variable Selection for Model-Based Clustering," Journal of the American Statistical Association, Mar. 2006, pp. 168-178, http://www.stat.washington.edu/raftery/Research/PDF/dean2006.pdf, pp. 168-178.

"International Search Report" and "Written Opinion of the International Searching Authority," Patent Cooperation Treaty Application No. PCT/US2016/058711, Dec. 8, 2016, 9 pages.

Mathew et al., "Intruders and Password Management," International Journal of Science Technology & Engineering, Oct. 2015, pp. 312-315.

Non-Final Office Action, Apr. 1, 2015, U.S. Appl. No. 14/585,051, filed Dec. 29, 2014.

Non-Final Office Action, Apr. 20, 2015, U.S. Appl. No. 14/614,897, filed Feb. 5, 2015.

Notice of Allowance, Sep. 25, 2015, U.S. Appl. No. 14/585,051, filed Dec. 29, 2014.

Final Office Action, Oct. 16, 2015, U.S. Appl. No. 14/614,897, filed Feb. 5, 2015.

Notice of Allowance, Mar. 15, 2016, U.S. Appl. No. 14/931,510, filed Nov. 3, 2015.

Notice of Allowance, Jul. 29, 2016, U.S. Appl. No. 15/141,779, filed Apr. 28, 2016.

Non-Final Office Action, Jul. 29, 2016, U.S. Appl. No. 15/142,997, filed Apr. 29, 2016.

Non-Final Office Action, Sep. 7, 2016, U.S. Appl. No. 15/099,297, filed Apr. 14, 2016.

Notice of Allowance, Jan. 3, 2017, U.S. Appl. No. 15/142,997, filed Apr. 29, 2016.

Final Office Action, Mar. 14, 2017, U.S. Appl. No. 15/099,297, filed Apr. 14, 2016.

Non-Final Office Action, May 23, 2017, U.S. Appl. No. 15/457,921, filed Mar. 13, 2017.

Non-Final Office Action, Aug. 23, 2017, U.S. Appl. No. 15/371,047, filed Dec. 6, 2016.

Notice of Allowance, Aug. 24, 2017, U.S. Appl. No. 15/099,297, filed Apr. 14, 2016.

Non-Final Office Action, Sep. 7, 2017, U.S. Appl. No. 15/374,212, filed Dec. 9, 2016.

Non-Final Office Action, Sep. 7, 2017, U.S. Appl. No. 15/373,298, filed Dec. 8, 2016.

* cited by examiner

SYNTHETIC DIVERSITY ANALYSIS WITH ACTIONABLE FEEDBACK METHODOLOGIES

FIELD OF THE PRESENT TECHNOLOGY

The present technology relates generally to systems and methods for determining metrics, such as diversity or similarity, between entities and the application of those metrics as actionable feedback loops which can be used to increase diversity, reduce similarity amongst groups of entities, or conduct synthetic analyses when entity data is incomplete. These metrics may relate to diversity of aggregate cyber security risk for use in planning or filtering new entities so as to increase that diversity.

SUMMARY

Various embodiments of the present technology include a method wherein for each of a plurality of entities in a portfolio, receiving entity data that is indicative of attributes of an entity. The method may further include determining that the received entity data for at least some of the plurality of entities is missing a portion of the entity data that is required to perform a cyber risk analysis; synthesizing the missing portion of the entity data; comparing a combination of the received entity data and synthesized missing portion of the entity data for each of the plurality of entities to each other; assessing risk of an entity of the plurality of entities, using a computer agent configured to utilize the combination of the received entity data and the synthesized missing portion of the entity data, wherein the assessing of risk comprises: (i) generating a disaster scenario that comprises elements of a disaster event; (ii) modeling the disaster scenario against a profile of the entity; and (iii) determining theoretical damage based on the modeling; and automatically recommending, based on the assessed risk, changes to reduce the assessed risk to mitigate the theoretical damage. The method may further include receiving feedback from an end user in response to assessing the cyber risk and updating the network or computing system in response to the feedback.

In some embodiments, the synthesizing includes comparing the plurality of entities of the portfolio that is missing a portion of the entity data to entities with complete entity data, and generating a synthesized portfolio. The generating may comprise selecting entities having complete entity data to replace the plurality of entities that is missing a portion of the entity data based on the comparison, wherein the entities with complete entity data are within additional portfolios that are similar in entity composition to the synthesized portfolio.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
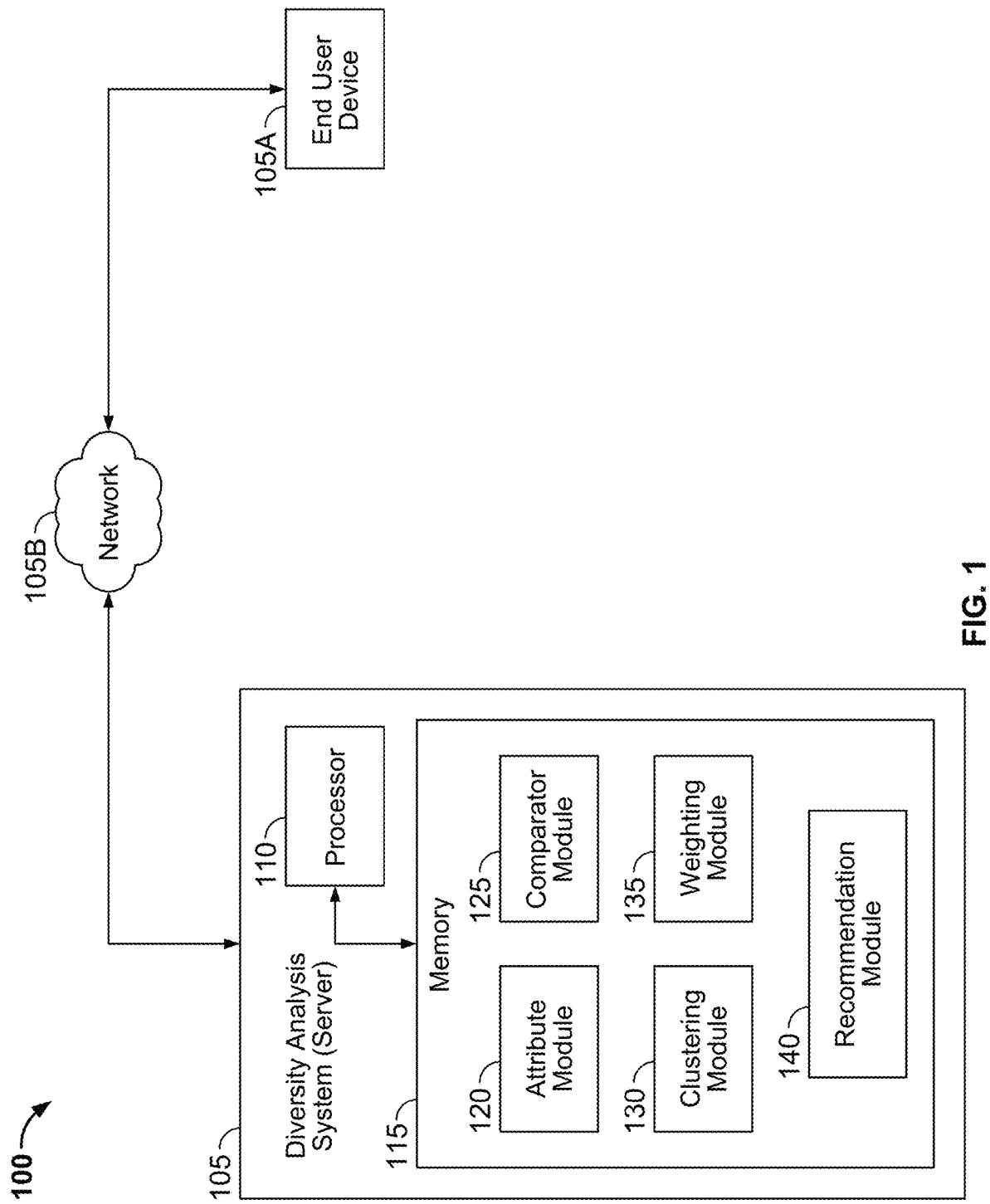
FIG. 1 is a high level schematic diagram of computing architecture for practicing aspects of the present technology.

Various embodiments of the present technology are directed to systems and methods for determining diversity and/or similarity between entities with respect to risk, (e.g., cyber security risk), and the utilization of these metrics in various ways to improve diversity between the analyzed entities. In one embodiment, an insurer may desire to understand the diversity of their insured entities with respect to aggregate cyber risk and utilize a measure of diversity to prevent too much similarity between insured entities, and/or to compare their diversity to their industry peers. Additionally, reinsurers, rating agencies and/or insurance brokers may also utilize the present technology. For example, reinsurers may want to compare one insurer's portfolio to another insurer's to buy, invest, and/or cover. Brokers may wish to review their portfolio of clients, and ratings agencies may review an insurer's portfolio and use it to provide a rating on the financial strength rating of the insurer. To be sure, cyber insurance and other insurance risks can be a function of similarity. For cyber insurance risk, if insured entities are very similar to one another in a variety of key attributes such as revenue, clientele, industry, technology utilized such as cloud computing service provider, content delivery network (CDN) provider, operating system, firewall vendor, intrusion detection system vendor, security services provider, etc., or other factors, a loss, (e.g., due to a cyber attack), by one of these insured entities might imply that other insured entities having similar attributes will also experience a loss. For example, a plurality of web hosting provider may source their servers from the same company. A cyber attack of that company's servers may equally affect all of these web hosting providers that use the server, and consequently affect an insured that utilizes one of those web hosting providers to host the insured's website and other web services.

To be sure, diversity in attributes between entities can decrease the likelihood that a covered loss by any particular entity will also likely affect the other entities. Thus, the desire is to have the insured entities be as diverse as possible in the aggregate, to reduce overall risk. Conversely, similarity of attributes between insured entities can increase risk for the insurer.

Using the present technology, an end user may determine similar attributes shared between pluralities of entities. These shared attributes can be aggregated into clusters to locate groups of entities with shared attributes. In one example, several entities use the same content delivery network (CDN), the same cloud service provider, a similar website traffic profile, have overlapping executives, and report similar revenue. While these entities may also share attributes with other entities, these attributes are used in various embodiments to create a cluster or grouping of entities that, when considered in the aggregate, have a low diversity score due to the similarities in this example.

End users may use the present technology to learn their aggregate cyber risk compared to industry peers and use that information to, for example, screen potential target entities for inclusion into a group based upon how the potential addition of their attributes to the group would affect the diversity score for the end user's collection of entities. In alternative exemplary embodiments, the system may instead of, or in addition to, outputting a diversity or clustering score, may output a different value analyzing the entities, for example a probable maximum loss (PML) and/or an expected portfolio value.

The present technology can be used to analyze diversity/similarity between many entities. The diversity/similarity analyses can use hundreds and even thousands of attributes, looking for diversity or commonality therebetween. In some instances, the end user can adjust the attributes and/or select which attributes are important to them and the system will analyze only these attributes when determining diversity, (e.g., a diversity score for aggregate cyber risk).

While the examples above mention the suitability of the present technology for use with insurance planning, in general, and cyber insurance planning, in particular, the present technology is not so limited. Other examples of technologies that can implement the present technology are financial portfolio managers, technology companies that desire infrastructure robustness, human resources, venture capital investment, and so forth.

These and other advantages of the present technology are provided below with reference to the collective drawings.

FIG. 1 is a high level schematic diagram of a computing architecture (hereinafter architecture 100) of the present technology. The architecture 100 comprises a diversity analysis system 105 (hereinafter also referred to as system 105), which in some embodiments comprises a server or cloud-based computing device configured specifically to perform the diversity analyses described herein. That is, the system 105 is a particular purpose computing device that is specifically designed and programmed (e.g., configured or adapted) to perform any of the methods described herein.

The system 105 can be coupled with end user device 105A, such as computer, tablet, Smartphone, or other similar end user computing device. End users can interact with the system 105 using their end user device 105A. The end user device 105A and system 105 can be coupled using a network 105B.

A suitable network 105B may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network.

In one embodiment, the system 105 comprises a processor 110 and memory 115 for storing instructions. The memory 115 can include an attribute module 120, a comparator module 125, a clustering module 130, a weighting module 135 and a recommendation module 140. As used herein, the terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

For context, the diversity analyses according to various embodiments of the present technology begin with input for the attribute module 120. A set of variables that are indicative of attributes of an entity may be input into the attribute module 120. In one embodiment, the variables can include technologies a company might employ (e.g., internally and externally for Internet communication such as e-mail, website, and social media online presence) such as CDN provider, cloud service provider, server type, OS type, visitor traffic knowledge, customer profiles, as well as other non-technical information such as revenue, number of employees, years in business, and so forth. In various embodiments, the breadth and type of variables that can be analyzed and correlated are unlimited. In some embodiments, the breadth and type of variables that can be analyzed and correlated for the company and for their industry peers, for comparison, may be limited by breadth and type of information that is available at online sources concerning the same. Again, an end user can define or specify the types of variables that are of interest to them.

For example, if the end user is an insurer, the insurer may desire to know how diverse their insured entities are with respect to cyber security risk relative to a wide and divergent set of variables. In regard to a cloud computing provider, for example, interest in such diversity may be only in technological variables such as traffic, page views, bandwidth, and other variables related to cyber risk.

In some embodiments, entities and end users can access and interact with the system 105 using a variety of graphical user interfaces (GUIs) such as a dashboard, including various elements as described herein. The system 105 can use the dashboard to display messages or notifications as well as diversity scores, similarity scores, and/or recommendations.

The system may gather variables for an entity by querying the entity for information, scraping available online sources such as websites, corporate filings, news sources, other public record databases and resources. Additionally, data may be gathered from the entity's network using devices already present there or by placing a new device on the entity's network to gather more data. The data collecting device may be a server, router, firewall, switch, or repeater, or may be a software agent or routine that monitors traffic and/or performs packet inspection. The data collecting device may be on the company's network and/or its periphery, and may collect and/or analyze the data, while also transmitting it to system 105. In this manner, additional, proprietary data may be gleaned from a particular entity's network. Regardless of how the variables are obtained, the variables are input into the attribute module 120. The attribute module 120 can format or normalize the input as needed for consistency.

In one embodiment, the comparator module 125 is executed to perform a variable comparison on all or a subset of the variables. The comparison can be for all or only a subset of all entities. The subset of variables can be selected by the end user, as well as the entities analyzed.

The comparator module 125 is configured to identify variables shared between entities or groups of entities. The implications of this analysis are multifaceted. For instance, the same variable can be shared between many entities, which leads to an inference that a particular variable might be problematic. This lack of diversity is a more pointed or granular lack of diversity.

In another example, multiple variables are shared between numerous entities. This diversity relationship between the entities signifies a more prolific lack of diversity.

Localized commonality can be found between small groups (even between two) entities. This type of similarity can be inferred as less problematic than the more prolific examples provided above where similarity exists between numerous entities.

The comparator module 125 can cooperate with the clustering module 130 to create commonality clusters (e.g., various clusters of commonly shared variables). In one embodiment, if five entities are being analyzed, many different clusters can be identified. By example, if variables A-D are being analyzed with respect to entities 1-5, the comparator module 125 finds commonality between entities 1 and 3 with respect to variables B and C. Also, the comparator module 125 finds commonality between entities 1-5 with respect to variable A. Other similar correlations can be found.

The clustering module 130 can display to the end user these commonality clusters, which indicate areas of non-diversity. Also, these commonality clusters can be utilized by the recommendation module 140 to create action items for the end user that if enacted would change the diversity score. Details regarding the diversity score are found in greater detail below.

In some embodiments, the comparator module 125 creates a diversity score or index. This diversity score represents how dissimilar the analyzed group of entities is relative to one another in view of their variables.

The diversity score can include a percentage of the overall number of compared variables that are dissimilar to those that are shared. The diversity score can be represented variously as a fraction, a decimal, or a percentage, and may be included in the graphical user interface (e.g., dashboard.) Additionally, or alternatively, the diversity score may be normalized into a number within a user-defined, or predefined, range, similar to a credit score.

In some embodiments, the comparator module 125 can cooperate with the weighting module 135 to applying a weighting to one or more variables. In one embodiment, the weighting is selected by an end user such as an insurer. For example, an insurer determines that industry serviced, gross revenue, and customer country of origin are important variables to analyze, (e.g., for assessing individual and aggregate cyber risk.) For instance, if the insurer knows that gross revenue is very important to the calculation, the insurer can specify that the gross revenue variable is to be given greater importance in the analysis than other variables. In another example, the insurer can assign a weight to each variable based upon importance.

In some embodiments, the system can determine weightings and variables based on industry knowledge acquired, and use machine learning, big data and other "tools" to make an "educated" determination. For example, the weighting of variables can also be determined by the system 105 based on information such as actuarial data, industry practices, or other rules established by end users but which are intended to be applied by default. The selection of a weighting schema by the system 105 can be based on variables for the entities. For example, if the system 105 determines that the entities are all physicians, the system 105 can select weightings that are appropriate for medical practices or hospitals. Such determinations by the system may be adjusted and/or otherwise specified by the end user (e.g., using the dashboard) to tailor them for their particular circumstances, preferences, or other factors.

In some embodiments, the diversity score can be represented as a diversity graph that illustrates the connection between entities. Entities can be graphically connected based on commonality of variables between entities. For example, certain entities may be connected as being banks that present particularly enticing targets for cyber criminals and thus particular cyber risks.

In response to calculating a diversity and/or similarity score, the recommendation module 140 can be executed to provide the end user with some type of actionable feedback. For example, the recommendation module 140 can provide the end user one or more actions to the end user based on the diversity score and the clusters of similar variables. These one or more actions potentially increase the diversity score if enacted by the end user.

In one example, the recommendation module 140 can automatically identify variables, which if changed, would affect the diversity score. For example, if the entities are or utilize technology company service providers that use a particular CDN, the recommendation module 140 can output a recommendation that diversification in this area would be beneficial. The end user can alert the entities and encourage them to explore other options for CDNs. If the end user is an insurer, for example, the insurer can encourage this change by offering rate concessions to the insured entities. Various embodiments of the system thus may automatically provide the diversity score or other information to the end user regarding diversity, which the end user can utilize to encourage or effect various changes (e.g., via rate concession, screening of potential new entities, adjusting rates based on diversity, or other actions prompted by the system's determinations.) The diversity score might also be used to inform the insurer as to which polices should be renewed and which polices should not be renewed. For example, if a potential new (target) entity to add presents an unacceptable cyber risk, based on the diversity analysis, the insurer may choose not to provide the entity' policy or to provide the policy at a rate commensurate with the risk.

In another example, the recommendation module 140 can identify problematic common variables that negatively impact diversity scores. For example, the recommendation module 140 may identify shared infrastructure such as CDNs and cloud service providers as particularly problematic variables that are commonly shared between several entities. In some embodiments, the recommendation module 140 can also identify network traffic, network traffic patterns, firewalls, firewall policies that are commonly shared. Changing these shared variables would likely increase the diversity score for these entities. Conversely, the recommendation module 140 can determine key variables that if changed would negatively affect a diversity score. The recommendation module 140 can identify these variables to the end user as desirable.

Actions that could be taken in response to this information could include a project plan that specifies that the insurer is to find new customers that do not share these problematic variables. Likewise, the project plan could also or alternatively specify that the insurer is to find new customers that do share key positive variables.

In one example, an action includes the recommendation module 140 creating and providing the end user with a variable profile of a target entity that when added to the plurality of entities increases the diversity score. For example, the recommendation module 140 could create a profile for a prototypical new client that is in a different technology sector or a completely different industry sector. In another embodiment, the recommendation module 140 could create a profile for a prototypical new client that includes desirable variables, rather than merely a client that excludes certain disfavored variables.

In one embodiment, the recommendation module 140 can provide the end user with a list of entities of the plurality of entities that are lowering the diversity score. Again, as mentioned above, certain clusters of variables may be found in common between entities. Certain ones of these clusters may have more of a negative impact on the diversity score than others. For example, commonality between headquarters or domicile may have no impact on the diversity score, even if this variable is shared in common between several entities. On the other hand, commonality in gross revenue or average employee age may have a drastic impact on the diversity score for one reason or another. To be sure, commonality of a variable(s) does not always negatively affect the end user or the end user's business. In these instances the commonality can be ignored or weighted so as not to affect the calculated diversity score.

In another example, the recommendation module 140 can provide the end user with a list of entities of the plurality of entities that, if lost would lower the diversity score, which can prompt the end user to take action to avoid.

In another example, action the recommendation module 140 can compare a variable profile for a new entity to determine if the addition of the new entity to the analysis will negatively or positively impact the diversity score of the group.

For example, the attribute module 120 can receive a variable profile for a new entity and parse out the variables which are indicative of attributes of the new entity. This profile could include an application form, a survey, or any other content that is capable of conveying variables.

Next, the comparator module 125 adds a set of variables of the new entity to the comparison described above and repeats the calculation of the diversity score. The recommendation module 140 can alert the end user if the addition of the new entity decreases the diversity score. The recommendation module 140 can alert the end user if the addition of the new entity increases the diversity score as well.

In some embodiments, the recommendation module 140 updates the diversity score based on feedback received from the end user. For example, if the end user wants to view how the addition of a proposed new client will affect an existing diversity score, the profile for the new client is added to the system and the variables for the new client are processed and added to the comparison process. A new or updated diversity score is calculated and displayed to the end user.

The difference between the new diversity score and the old diversity score is expressed as a diversity delta. In some embodiments, the system 105 can apply thresholds to the diversity delta to determine if a proposed change to the entity grouping is sufficient to warrant the proposed change. For example, the system 105 may require at least a net change or diversity delta of 20%. Other percentages can also be utilized. The present technology provides information related to the updated information (the new diversity score), including differences (the amount of the change made in one or more updates, namely the delta), and trends (patterns over many time steps).

The present technology also provides attribution information when a diversity score changes. In particular, the methods and system indicate to a user why the score has changed, namely what exactly has changed in the underlying data sets to effect that higher level score change. In this manner, the systems and methods of the present technology provide detailed information to the user to identify the changed data, and thereby understand the positive and negative impacts of the user's actions on the diversity score.

The system 105 can also build an entity portfolio for an end user with knowledge gained from an analysis of variables for a plurality of entities. For instance, the system 105 can create a report that informs the end user as to how many and what type of entities a portfolio should have to be balanced in terms of diversity, (e.g., with respect to cyber risk.) For example, the report may indicate that an insurer should have a certain percentage of clients in the banking sector, a certain percentage in the technology sector, and a certain percentage in the medial industry. These sectors of the portfolio are deduced by comparing variables for various entities in a given industry that lead to a suitable diversity score.

It will be understood that the diversity score can be counterbalanced by other factors such as revenue for the end user. That is, an insurer may be more likely to accept a lower diversity score from a group of entities that pay higher premiums or a group of entities that is at least partially self-insured.

Figure 2:
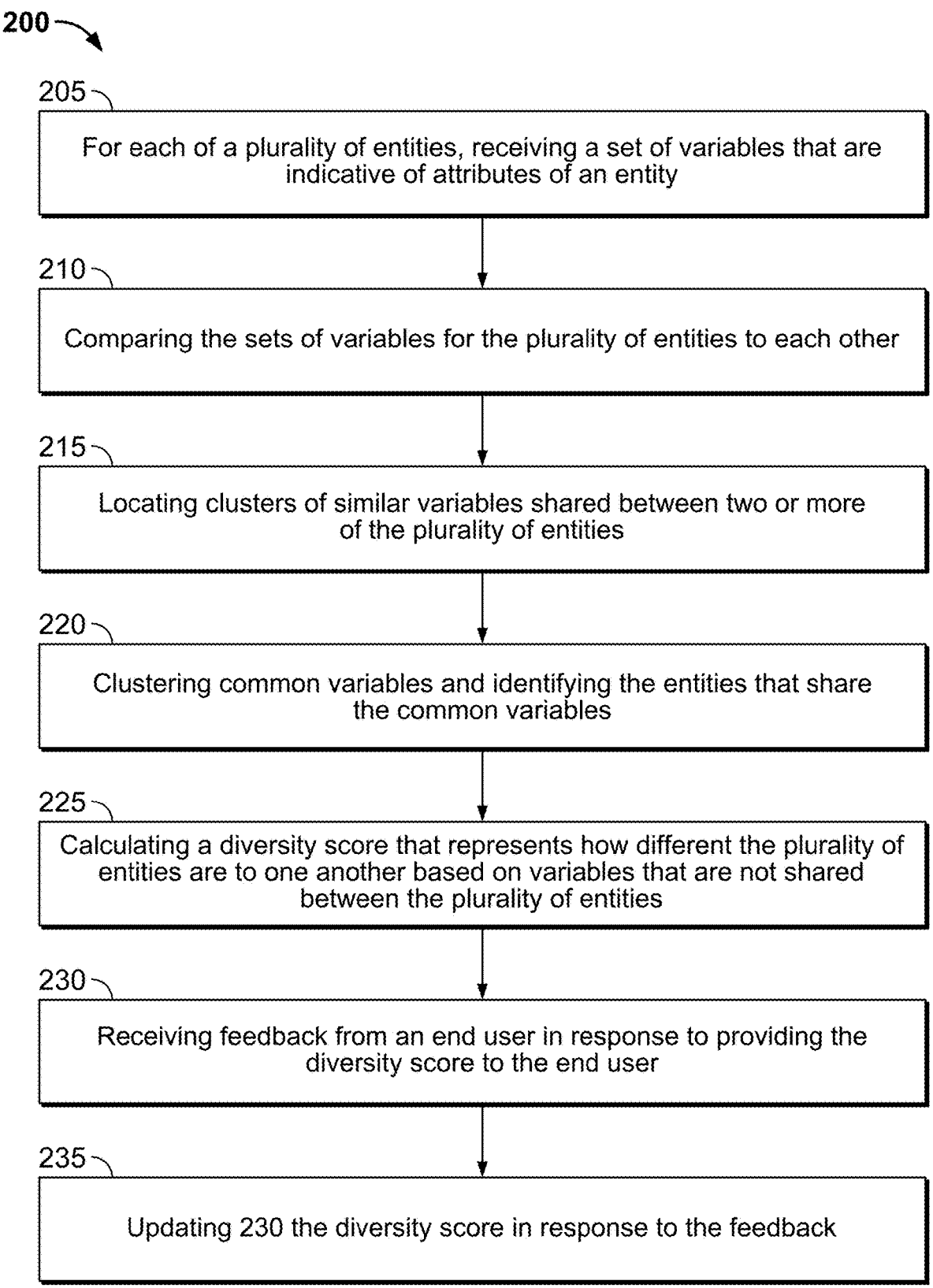
FIG. 2 is a flowchart of an example method for determining entity diversity.

FIG. 2 is a flowchart of an example method 200 that is executed by the system (e.g. system 105), in accordance with the present technology. The method 200 includes the system 105 (for each of a plurality of entities), receiving 205 a set of variables that are indicative of attributes of an entity. These variables can include any number or type of variables that represent the attributes of the entity.

These variables are collected for numerous entities that may belong, in some embodiments, to a particular class or group. For example, the entities could include all employees in a company, all insured customers of an insurance agency, investors in a mutual fund, or other groups.

Next the method 200 includes the system 105 comparing 210 the sets of variables for the plurality of entities to each other, and locating 215 clusters of similar variables shared between two or more of the plurality of entities.

Next, the method 200 includes the system 105 clustering 220 common variables and identifying the entities that share the common variables. These clusters are indicative of non-diversity between these entities.

Next, the method 200 includes the system 105 calculating 225 a diversity score that represents how different the plurality of entities are to one another based on variables that are not shared between the plurality of entities. This diversity is directly related to the commonality discovered above. The more similar or commonly shared variables exist, the less diverse the entities are relative to one another, as a general rule. Again, as mentioned above, some variables will have little to no impact on diversity as dictated by weighting or variable selection by the end user. For example, if a commonly shared variable is not included in the diversity calculation by the end user the variable has no impact on the diversity score.

Next, the method 200 includes the system 105 receiving 230 feedback from an end user in response to providing the diversity score to the end user. Also, the method 200 includes the system 105 updating 235 the diversity score in response to the feedback.

Various types of feedback are contemplated and illustrated in FIG. 2. The feedback can take the form of a suggestion, option, report, or other output that is actionable by the end user. Exemplary methods and systems according to the present technology may also provide benchmarking over time. In this manner, an insurance company or other entity tracking aggregate cyber risk may track their diversity score over an adjustable time period, for example days, weeks, months, and/or years.

It will be understood that the methods illustrated in flowchart form are susceptible to execution in various forms such that not all steps may be required. In some instances, additional steps can be added. Some steps may be rephrased or replaced with other steps, in accordance with the claimed technology.

Figure 3:
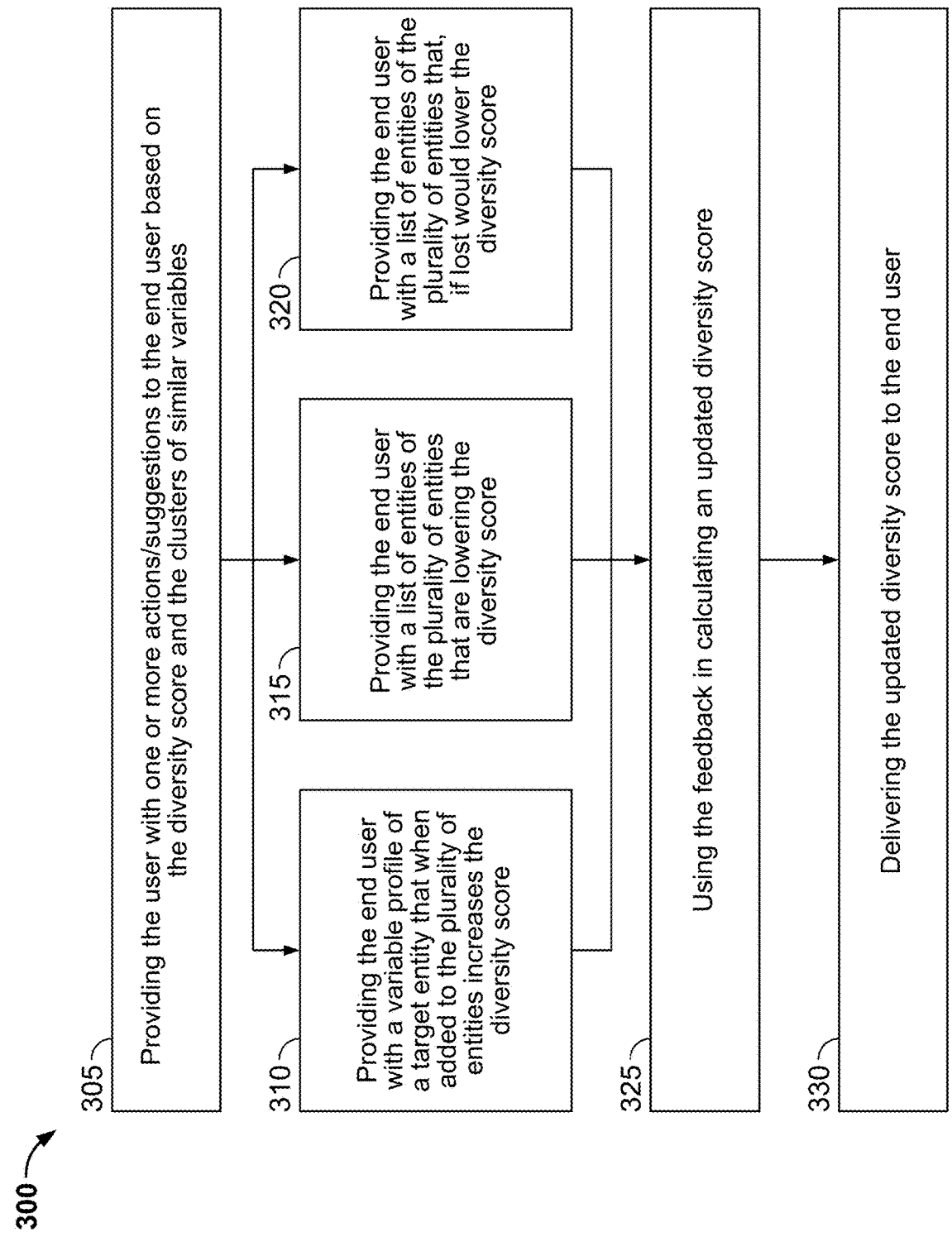
FIG. 3 is a flowchart of an example action and feedback loop method for updating a diversity score and improving client diversity.

In FIG. 3, the flowchart illustrates the method 300 including the system 105 providing 305 the user with one or more actions/suggestions that to the end user based on the diversity score and the clusters of similar variables. These actions can potentially increase the diversity score if enacted by the end user.

In step 310, an action includes providing the end user with a variable profile of a target entity that when added to the plurality of entities increases the diversity score.

In step 315, an action includes providing the end user with a list of entities of the plurality of entities that are lowering the diversity score.

In step 320, an action includes providing the end user with a list of entities of the plurality of entities that, if lost, would lower the diversity score.

Regardless of the action taken (steps 310, 315, and/or 320), the feedback is used in calculating 325 an updated diversity score and delivering 330 the updated diversity score to the end user.

Again, these options are merely examples and are not intended to be limiting. These options can be provided individually or in combination, if desired.

Figure 4:
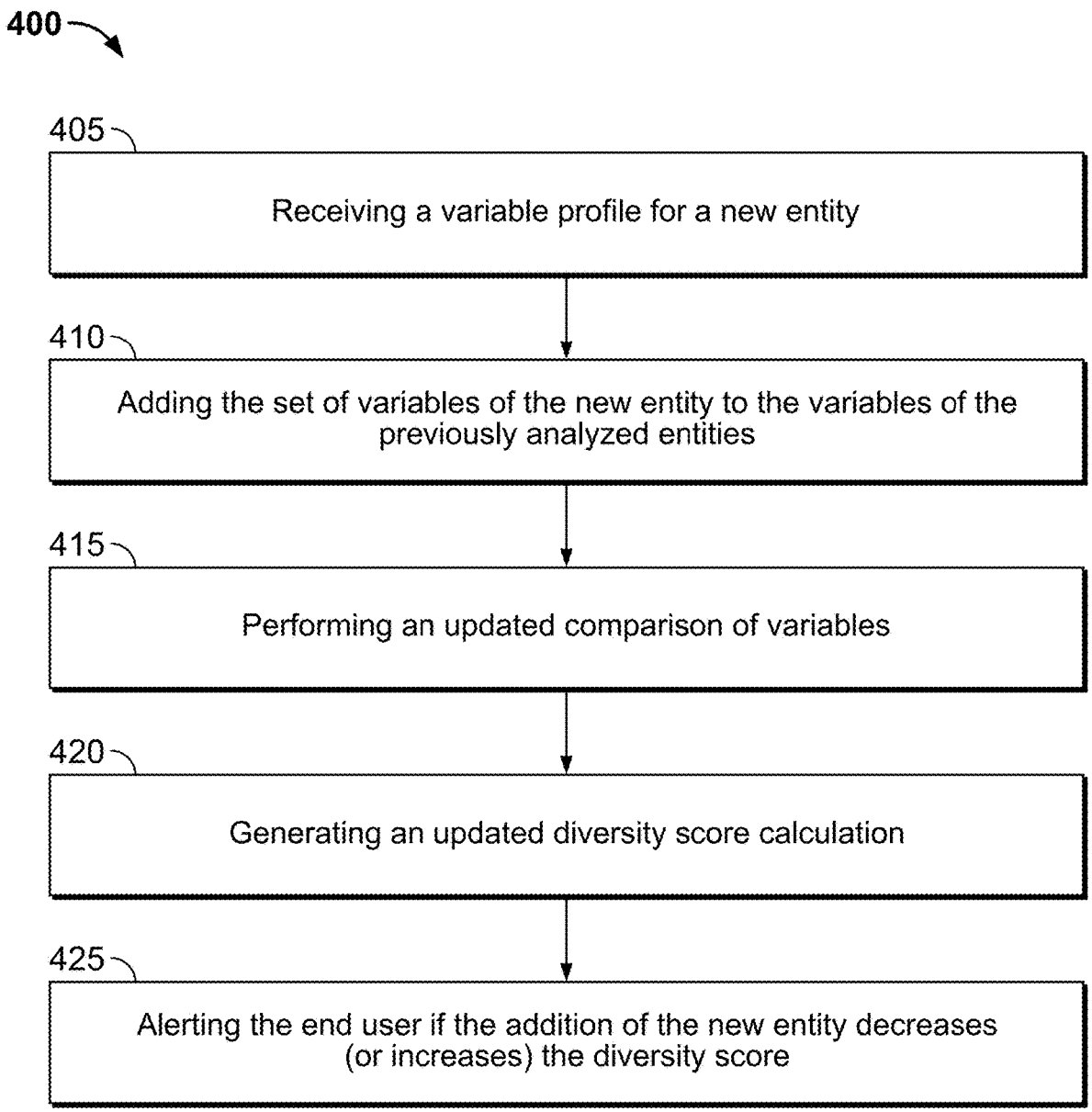
FIG. 4 is a flowchart of a method for analyzing a new client's impact on an existing diversity calculation.

FIG. 4 is a flowchart of a new entity analysis method 400. In the method 400, the system (e.g. system 105) is utilized to compare the variables of a new entity to an existing diversity analysis. For example, an insurer desires to determine how the addition of this new entity will affect the diversity of an existing client base. This aggregate risk analysis can be used to ensure that diversity is maintained or increased when a new client is added to an existing pool of clients.

The method 400 includes receiving 405 a variable profile for a new entity. The variable profile either includes a set of variables or a set of variables is deduced from the variable profile. As mentioned above, the variable profile can include an application form, a resume, a corporate filing such as a tax return, or any other document that includes attributes of an entity.

Next, the method 400 includes adding 410 the set of variables of the new entity to the variables of the previously analyzed entities and performing 415 an updated comparison of variables. Next, the method 400 includes generating 420 an updated diversity score calculation.

In some embodiments, the method 400 includes alerting 425 the end user if the addition of the new entity decreases (or increases) the diversity score. The end user can decided to accept or reject this new client based upon how the client affects the diversity score.

Advantageously, the present technology can be used in scenarios where diversity of clientele is desirous. The present technology can perform diversity analyses on potentially thousands of attributes across countless entities in ways that would be impossible to accomplish absent the use of the diversity analysis system. The diversity analyses of the present technology can bring clarity to business planning and project management, where integration of new clients/entities may affect the diversity of a current client base (either positively or negatively). Where diversification is desirable or required, the present technology provides a means for facilitating and maintaining this diversity in a way that is actionable and usable to the end user. That is, the present technology provides a way for end users to mitigate risk through diversification of their customer base or however diversity impacts their particular business or operations.

Various embodiments of systems and methods are provided for assessing and reducing cyber risks associated with companies or other entities. In various embodiments, a method comprises assessing risk of a cyber security failure in a computer network of an entity, using a computer agent configured to collect information from at least publicly accessible Internet elements. The cyber security failure may include a cyber attack and/or a privacy incident (including but not limited to an incident involving sensitive information), to name just a few. The computer agent may be further configured to collect and/or analyze information from the computer network of the entity.

The exemplary method includes automatically determining, based on the assessed risk, a change or a setting to at least one element of policy criteria of a cyber security policy. The cyber security policy may be a policy from an insurance company, a product warranty for first and/or third party costs that an entity purchases from one of a networking, security product, or services provider, to name a few. In various embodiments, the method includes automatically recommending, based on the assessed risk, computer network changes to reduce the assessed risk and providing one or more recommended computer network changes to reduce the assessed risk, enactment by the entity of at least one of the one or more of the recommended computer network changes to reduce the assessed risk to the entity. In some embodiments, the exemplary method includes determining that the entity has enacted at least a portion of the recommended computer network changes, and in response, and automatically reassessing the cyber security risk of a cyber security failure in the computer network of the entity based on the enacted recommended computer network changes. The exemplary method further includes dynamically re-determining, based on the reassessed risk of a cyber security failure in the computer network of the entity, the change or the setting to the at least one element of policy criteria of the cyber security policy. In various embodiments, the at least one element of policy criteria of the cyber security policy is a term and/or a condition. For example, a term and a condition may include a retention amount, a deductible, a premium, a coverage limit, a future valuation, a term length, and so forth.

Various embodiments of systems and methods are provided for calibrating cyber risks associated with commercial markets. In various embodiments, a method comprises assessing the risk of a cyber security failure in a computer network of a commercial market, using a computer agent configured to collect information from at least publicly accessible Internet elements. The cyber security failure may include a cyber attack and/or a privacy incident (including but not limited to an incident involving sensitive information), to name just a few. The computer agent may be further configured to collect and/or analyze information from the computer network of the commercial market. In some embodiments, the commercial market is insurance, corporate credit, small business loans, global equities, derivatives, or futures, to name just a few. In various embodiments, the policy is a policy from an insurance company, or a warranty, to name a few. In various embodiments, the method includes automatically recommending computer network changes to reduce the assessed risk; and automatically reassessing the cyber risk of the computer network of the commercial market based on the recommended computer network changes. In some embodiments, the entity is a commercial market for at least one of insurance, corporate credit, small business loans, global equities, derivatives, and futures. In various embodiments, the method includes calibrating cyber risks associated with the commercial market.

In some embodiments, the method includes, based on the assessing of risk of the cyber security failure in the computer network of the entity, plotting one or more features of the entity and other members of a peer group of the entity, the plotting being configured to visually illustrate the risk of a cyber security failure in the computer network of the entity; and the automatically recommending of computer network changes being based on the plotting. The plotting may be configured to visually illustrate the cyber risk of the entity.

In some embodiments, the method comprises determining a susceptibility score of the entity with respect to cyber risk, which may be considered the quality of the defense with respect to repelling, defeating, or preventing a security failure.

In some embodiments, the method also comprises determining a motivation score of a hacker or other actor with respect to initiating one of a cyber security failure. A composite score may be created from the motivation score and the susceptibility score.

The exemplary method and system may be used in a cyber policy market, and/or by a cyber policy provider providing policies. The cyber policy may include a cyber risk assessment/management service, which may provide feedback to one or both of the policy company and the insured entity, enabling the entity to determine how to reduce their cyber risk, and/or how they are positioned within their peer group and/or within a universe of companies with respect to their cyber risk. As used herein, the policy, including but not limited to a cyber policy, may be a policy from an insurance company or it could be a product warranty for first and/or third party costs that an entity purchases from a networking or security product or services provider.

Additionally, following the recommendations may enable the policy company to update and/or change policy criteria of a cyber security policy. In still further alternatives, the composite score of several or many entities may be aggregated and used by insurance companies, reinsurance companies, brokers and/or ratings agencies to understand and/or evaluate an aggregate risk and assess insurance premiums and/or reinsurance treaties and/or change or evaluate a credit rating. This is described in further detail above.

Also, as mentioned above, the composite store can include facets of creditworthiness, small business risk, and other commercial metrics of commercial risk.

Cyber insurance insures entities against damage and/or loss due to security failures (e.g., a cyber attack, a privacy incident). Assessing cyber risk can be a difficult task due to the volatility of the cyber environment. For example, a risk of a security failure such as a cyber attack lacks actuarial data since there is an active adversary behind cyber attacks, and past cyber attacks do not predict future cyber attacks. Better analysis of cyber risk, including the risk of security failures, and providing greater service to insurance companies and insured entities, is desirable The technology disclosed herein provides a cyber risk assessment, and provides methods and systems for improving a cyber risk assessment, by, for instance, reducing a risk of a cyber attack, predicting the probability of a cyber attack, and/or determining the extent to which a cyber attack might cause damage. Exemplary methods plot the cyber risk within a peer group, which may be defined by industry, revenue, and/or any other appropriate metric. Various exemplary methods plot the cyber risk within the universe of companies, (e.g., universe of companies for which such cyber risk has been assessed. Exemplary methods assess risk in a plot using one feature. In other examples, multiple features may be plotted into a matrix.)

For those exemplary matrix embodiments, the assessment of risk is plotted with a two (or more) dimensional analysis, which may be plotted into a two by two matrix or graph, or in any appropriate alternative visualization method, particularly for greater than two dimensions. For example, the two dimensions may be characterized as 1) motivation (which may be synonymous or similar to offense, e.g., the motivation of a bad actor to attack an entity) and 2) susceptibility (which may be synonymous or similar to defense, e.g., the susceptibility of an entity to prevent and/or repel a cyber attack, or compel more responsible behavior from employees and associates to prevent a privacy event with respect to sensitive information). Alternative axes for the two dimensional analysis are also possible, for example, measurements other than motivation and susceptibility. The system may output an estimated (or expected) commercial impact, which may encompass both the risk of a cyber attack, and the potential amount of damage caused by a cyber attack.

In addition to analyzing the cyber risk, the present technology may provide enhanced value by quantifying a cyber risk, thereby creating a market for it. Additionally, the present technology may provide a cyber risk management service tied to a cyber policy. A cyber policy (also referred to as a cyber insurance policy) as used herein includes any insurance policy covering any loss arising out of a security failure, including tangible and intangible property. The policy may cover both first party and third party losses arising out of any perils including a security failure. The policy may cover business interruption, loss of income, Director and Officer liability, information asset coverage, and extra expense coverage, or any other insured loss arising out of a security failure. A cyber policy as used herein includes security and privacy coverage, including regulatory coverage (e.g., FTC, Health Insurance Portability and Accountability Act (HIPPA)) covering fines and penalties, and defense costs and damages. The coverage provided by a cyber policy as used herein may provide for privacy breach coaches, forensic experts, a public relations campaign, cyber extortion, information asset recovery, business interruption (including for example, lost income, extra expenses, and/or all costs incurred but for the cyber security failure), or any other covered costs or losses.

Aspects of a cyber policy may be altered based on use of, and implementation of recommendations provided by, the cyber risk management service. These aspects may include any policy criteria of the policy. Elements of policy criteria include, for example, a retention amount, a deductible, a premium, coverage limits, future valuation, term length, or a term or condition of the policy.

The analysis may be a position on a graph, and may include a scatterplot of the peer group members, and/or a simple ranking amongst the peers. The analysis may be two (or more dimensional). Additionally or alternatively, the analysis may be resolved into a single composite score embodying the analysis. The plot may be changed to include more or fewer members of the peer group based on further variables of the peer group members, for instance, revenue, etc. The plot may include points for a universe of companies along with the points for the particular entity. For a two dimensional analysis example, each axis may be a function of many sub-variables, discussed herein as examples of motivation and susceptibility. The sub-variables may be weighted equally, or differently, and the weighting may be static, dynamic, or customizable based on different analysis goals. Examples of motivation and susceptibility elements will be described in greater detail below.

The exemplary assessment system may provide recommendations to an entity to improve their cyber risk assessment, by, for instance, reducing their cyber risk. This may be accomplished by various methods, including increasing the susceptibility of the organization or entity, or decreasing the motivation of the attacker to go after this organization or entity. The recommendations may be specific and may impact one or both of the axes of the two dimensional risk analysis. Implementing the recommendations, which may be accomplished in some embodiments automatically, may reduce the risk of a cyber security failure.

Figure 12:
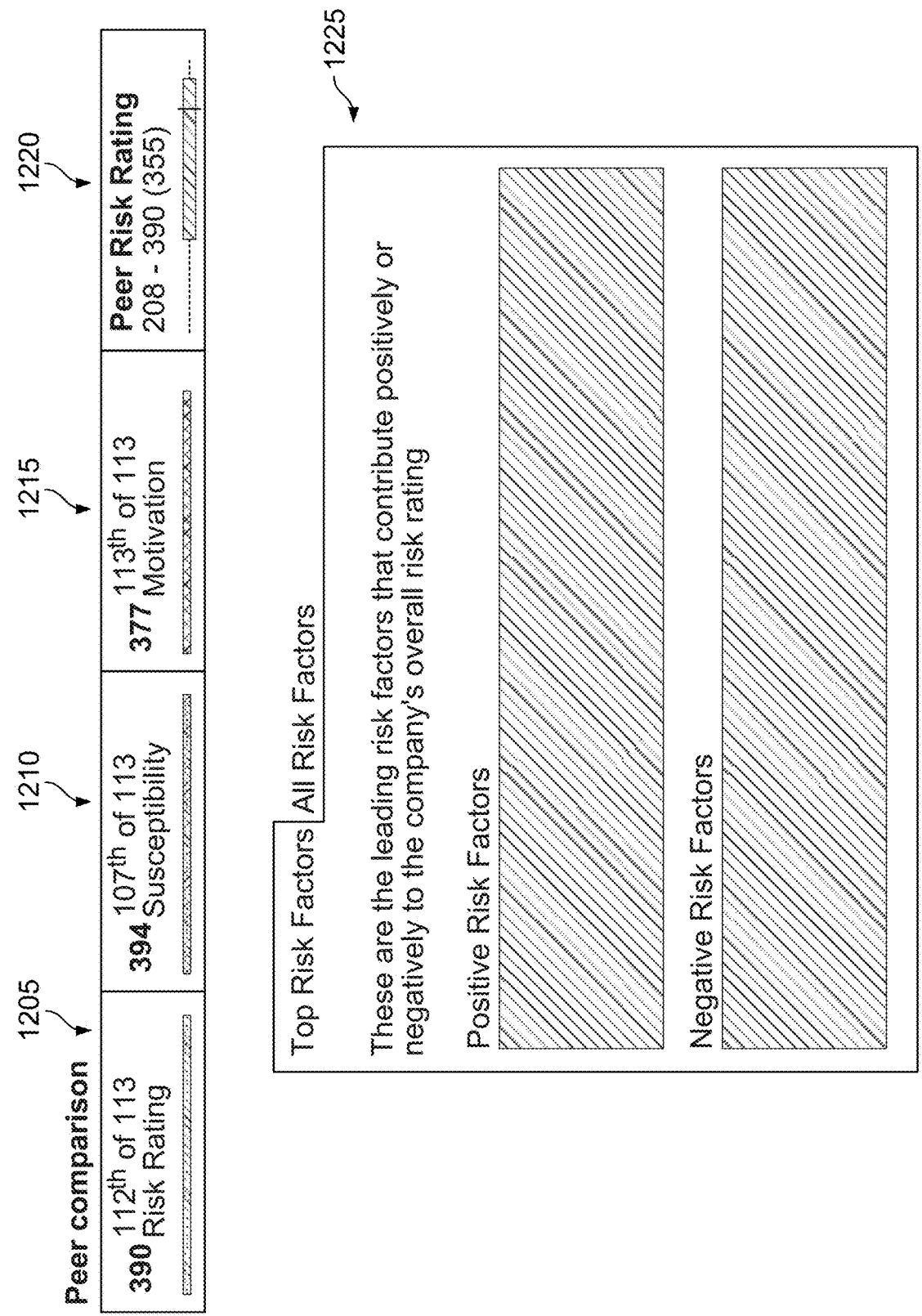
FIG. 12 is an example graphical user interface (GUI) that comprises a peer comparison chart.

Implementing the recommendations may impact an entity's relative position in their peer group, in a universe of companies, as well as any expected commercial impact of a security failure (e.g., a cyber attack, a privacy incident). Additionally, factors beyond the control of the company or entity, for instance, actions by the other peer group members, activity in the hacker community or vulnerabilities in software and/or hardware, may also impact both a relative risk analysis (e.g., impacting the company or entity's position in their peer group) and/or an absolute expected commercial loss. This change over time may be accessible and/or charted for trending information, which may be useful for planning and/or changing policy criteria (including the premium) for the policy. An entity may make a judgment of which recommendations to prioritize in implementation based on the different recommendations provided by the system to other members of their peer group. Examples of recommendations are illustrated in FIG. 12.

In some embodiments, the recommendations generated for an entity can be changed in comparison with other entities in a group. Thus, the system 505 can provide a first set of recommendations based solely on the motivation and/or susceptibility (e.g., cyber risk) analysis for the entity.

In another example, the system 505 can generate a second set of recommendations based on a comparison of the cyber risk for the entity to the aggregate risk score for many entities. This second set of recommendations includes additional recommendations for the entity which are determined to improve the cyber risk of the entity.

In some embodiments, the system 505 can determine risk factors that are discrepant between the entity and another entity (or an aggregate group of entities) and highlight these recommendations as being unique for the entity. For example, if the entity is the only one out of a group of their peer entities that does not use a CDN (content delivery network), the system 505 can highlight this difference. These unique discrepancies can illustrate areas where the entity is particularly or uniquely vulnerable.

Stated otherwise, the system 505 identifies clusters of susceptibility elements or motivation elements that are shared between two or more of the portfolio of entities. The clusters of susceptibility elements or motivation elements being associated with an increase in cyber risk. The recommendations generated by the system 505 for an entity of the portfolio of entities will cause a decrease in the cyber risk if implemented.

In various embodiments, where scores are tracked over time, the system 505 can also be configured to periodically reassess the cyber risk of an entity. In some embodiments, the reassessment occurs after the entity has implemented one or more of the recommendations.

It may be advantageous for the entity to understand not only that a particular score was changed, but also what affected the change in score. Thus, the system 505 is configured to provide attribution for a score change, including verifiable data including time and attribution information. This attribution identifies/represents the underlying data set which affected the score change, and shows why, how much, and how the score changes.

By way of example, the entity, unbeknownst to them, has a dramatic increase in pageviews on their website. This increase in pageviews causes an increase in the motivation score for the entity. That is, the increase in pageviews indicates that a hacker might be more motivated to hack the entity's webpage because of its high traffic profile.

In some embodiments, the system 505 can be used to automatically institute changes on behalf of the entity that will decrease the likelihood that the entity will experience or be adversely affected by a security failure such as a cyber attack. These automatic changes occur based on the recommendations generated for the entity.

In one example, the system 505 can establish new content hosts for the content of the entity. The system 505 can inform the entity that diversity in content hosting can decrease the likelihood that all of the entity's content or user information will be exposed, as compared to if the content is stored in one centralized location. To be sure, the system 505 can be used to automatically change technical aspects of the entity, such as computing diversity, content distribution and delivery, and other technical attributes.

In some embodiments, the system 505 comprises a commercial estimator module 550 that is configured to estimate a commercial impact to the entity for a simulated security failure (e.g., a cyber attack, a privacy incident). Thus, the system 505 can execute theoretical or simulated security failures against a cyber profile of an entity. In one example, the cyber profile for an entity is determined from the various susceptibility and motivation elements determined for the entity. The commercial estimator module 550 then calculates the effect of, for example, a distributed denial of service attack (DDoS) on the entity. To be sure, the simulated cyber attack in this example tests the susceptibility of the entity and is affected by the motivation regarding the entity. The economic impact can include an economic impact to the entity itself, other entities that depend upon the entity, or combinations thereof. For example, a cyber security failure for a commercial institution, such as a DDoS attack, can cause direct economic impact on the institution from website downtime. The cyber security failure can also cause a commercial impact to the customers of the commercial institution if social security numbers, account numbers, or other sensitive consumer and/or personal information is stolen.

Additionally, implementing the recommendations, provided by the cyber risk management service for example, may be paired with changes to the policy criteria of a policy. For example, implementation of certain recommendations may be paired with automatic renewal, a consequent lower (or higher or otherwise changed) cyber risk policy premium, better coverage limits, better term length, future valuation and the like. For example, the change to the policy criteria of the policy may be implemented after the end of the term (e.g., 1, 3, 6 or 12 months, or any other appropriate term) of the current policy, or may trigger a renewal option at the lower premium rate immediately or on an accelerated basis. In this manner, a cooperative and constructive relationship may be achieved between insurers and insured-entities, thereby creating a positive feedback loop of improved cyber preparedness and lower/higher/changed premiums. As discussed previously, implementation of recommendations provided by the cyber risk management service may cause a change in any element of the policy criteria of a cyber policy. For example, if the susceptibility of the entity is low, a higher deductible may be required, and vice versa. Additionally or alternatively, the type of coverage, a pricing or re-pricing, the amount of limits, an automatic renewal, and/or a renewal commitment, may change based on an increase or decrease in susceptibility of the entity, and/or an increase or decrease in motivation of an attacker of the entity. Additionally, as recommendations are implemented, or other changes in the entity or the entity's situation, the motivation and susceptibility, or other metrics, may change, and consequently a new analysis may be provided including new and/or changed recommendations for the entity.

Additionally or alternatively, the policy criteria of the policy itself may determine and/or change the weighting used in the system 505. In still further embodiments, a policy may affect the system 505 in other ways. In other words, the policy criteria of a policy may impact an assessment of a cyber risk, and/or an assessment service. For example, if a policy has a high deductible, the assessment service may not assess a motivation to initiate a security event. Various other options for having the policy criteria of a policy drive the type of assessment conducted are also possible.

The cyber risk management service as provided herein may include subjective evaluations, and may include vulnerability assessments, penetration testing, tabletop exercises, people services, risk engineering, and/or training exercises. Changes or renewed evaluations of any of these assessments may cause an increase or decrease in a susceptibility of the entity, an increase or decrease in a motivation of an attacker of the entity, and/or a change in any other metric used to evaluate an entity. Any of these changes based on a new or revised assessment may cause a remediation service and/or a new or additional assessment service, to be implemented. Trends, averages and/or changes to an assessment or evaluation may impact policy criteria of a cyber security policy, as discussed herein.

Figure 5:
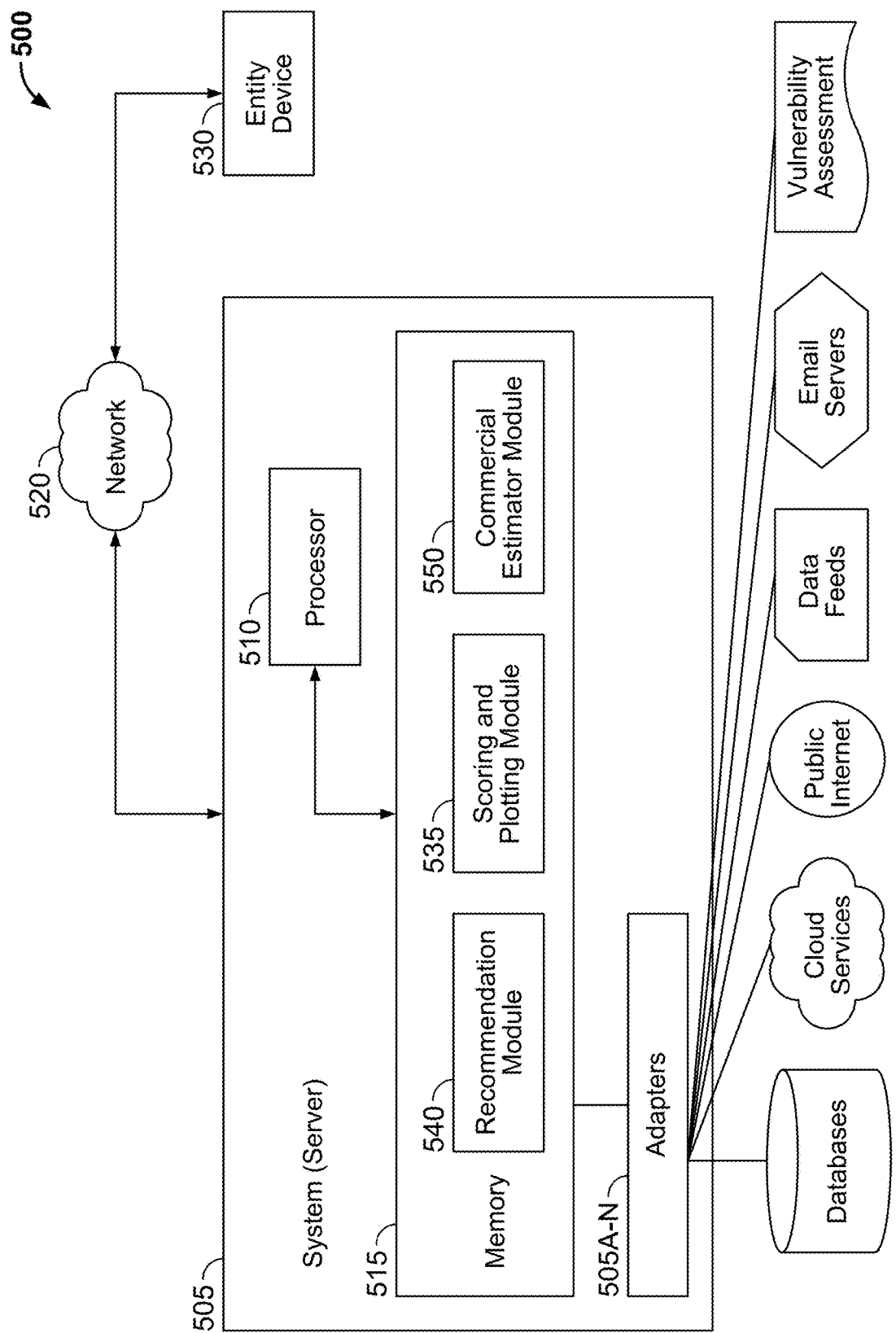
FIG. 5 is a block diagram illustrating a device according to an example embodiment.
Figure 6:
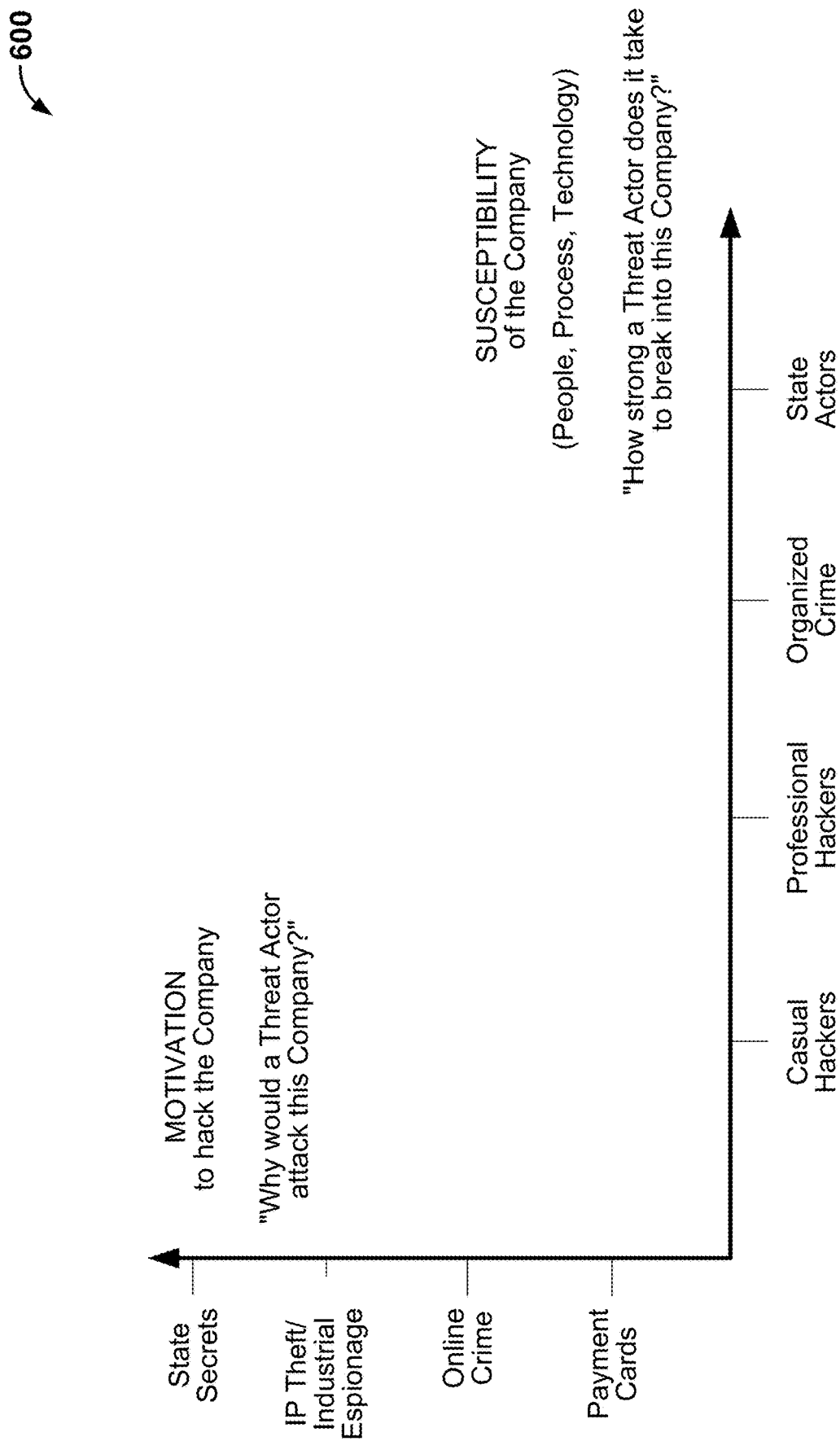
FIG. 6 is an example graphical user interface (GUI) that comprises a graphical representation that plots an entity's motivation and susceptibility relative to cyber risk.

Various embodiments of the present technology can be practiced with a local computer system, and/or a cloud-based system. FIG. 5 is a high level schematic diagram of a computing architecture (hereinafter architecture 500) of the present technology. The architecture 500 comprises a system 505, which in some embodiments comprises a server or cloud-based computing device configured specifically to perform the diversity analyses described herein. That is, the system 505 is a particular purpose computing device that is specifically designed and programmed (e.g., configured or adapted) to perform any of the methods described herein. The system 505 can be coupled with entity device 530 using a network 520.

In one embodiment, the system 505 comprises a processor 510 and memory 515 for storing instructions. The memory 515 can include a recommendation module 540. As used herein, the terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The system 505 may gather variables for an entity by querying the entity for information, scraping available online sources such as websites, corporate filings, news sources, other public record databases, and other resources. Additionally, data may be gathered from the entity's network using devices already present there or by placing a new device on the entity's network to gather more data. The data collecting device may be a server, router, firewall, switch, or repeater, or may be a software agent or routine that monitors traffic and/or performs packet inspection. The data collecting device may be on the company's network and/or its periphery, and may collect and/or analyze the data, while also transmitting it to system 505. In this manner, additional, proprietary data may be gleaned from a particular entity's network. The variables or a subset of the variables can be compared. The comparison can be for all or only a subset of all entities. The subset of variables can be selected by the end user, as well as the entities analyzed.

In some embodiments, the system 505 provides interfaces or adapters 505A-N that allow various resources to communicatively couple with the system 505. As an example, the system 505 can use an application program interface (API) or other communication interface. FIG. 5 illustrates example resources that can couple with the system 505. The system 505 can interrogate, for example, various databases such as corporate filings, news sources, and other public record databases. In another example, cloud services such as cloud storage and cloud computing environments. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources. The cloud may be formed, for example, by a network of servers with each server (or at least a plurality thereof) providing processor and/or storage resources. These servers may manage workloads provided by multiple users (e.g., cloud resource customers or other users). Typically, each user may place workload demands upon the cloud that vary in real-time, sometimes dramatically. The nature and extent of these variations typically depend on the type of business associated with the user.

The system 505 may also couple with the Internet as well as data feeds such as RSS feeds or social networks. Email behaviors can also be identified by interrogating email servers or email repositories.

In some embodiments, the system 505 can use vulnerability assessments generated by the entity or a third party, such as a cyber-security firm.

In contrast with a vulnerability assessment, which is more technical in nature, the present technology can also consider non-technical or semi-technical aspects of an entity and how these elements impact the cyber vulnerability of the entity. For example, non-technical elements include, but are not limited to, company size, revenue, company location, company industry sector, as well as other elements which are described herein. The present technology provides benefits above and beyond a typical vulnerability assessment, providing users with a robust and comprehensive view of a company's (or multiple companies') overall cyber security risk.

In some embodiments, the system 505 can obtain susceptibility information about entities from the following non-limiting list of sources or resources: (a) Framework; (b) Hosting/infrastructure; (c) Account management; (d) Authentication; (e) Authorization; (f) Scanning; (g) System vulnerability; (h) Ad/Partner integration; (i) Files/Directories/Links; and (j) Patching.

In some embodiments, the system 505 can obtain susceptibility information about entities from the following non-limiting list of sources or resources: (a) Customer Reviews; (b) Employee reviews; (c) Traffic statistics; (d) Business events/news; (e) Corporate connections; (f) Business type; (g) Customer data; (h) Brand/Revenue; (i) Employee profiles; (j) Social Media/Blogs; (k) Industry/Products; (l) Data Types; and (m) Company/Subsidiary connections.

For purposes of context, facets or features relating the motivation regarding a security failure (e.g., motivation of some actor, such as a hacker, to attack an entity, to expose sensitive information, to name a few) as well as the susceptibility of the entity in preventing or dealing with a cyber security event will be referred to herein as an element. Thus, there can be a plurality of types of susceptibility elements and a plurality of types of motivation elements. The actor may be a hacker, employee, another entity, to name a few.

Examples of motivation elements include: visibility; value; hacker sentiment; employee sentiment; company sentiment; customer sentiment, and combinations thereof—just to name a few. Each of these motivation elements may be further subcategorized as follows. Visibility may include information and/or derived measures related to the traffic, usage, and activity related to an entity, including but not limited to the in-links; pageviews; duration; traffic; links; page rank; market value; daily (stock) trade volume; exporting/importing; and combinations thereof—just to name a few. Value includes: revenue; net income; total assets; employees; and combinations thereof—just to name a few. Hacker sentiment includes: emails; credit cards; foreign languages; etc., which can be gathered from hacker forums and/or discussion groups, chat rooms, dark web, or dark net forums, such as the Tor Network, Internet Relay Chat (IRC), and combinations thereof—just to name a few. Employee sentiment includes: career opportunities; work/life balance; compensation; and combinations thereof—just to name a few. Company sentiment includes: senior leadership ratings; overall company ratings; recommendations; etc. Customer sentiment includes: product ratings; service ratings, and combinations thereof—just to name a few.

The present technology determines a level of susceptibility of the entity. Susceptibility may be considered a measure of People, Process, and Technology. People indicates how security-aware the entities' employees, principals and/or members are. In particular, do the people associated with the entity understand the risks, are they competent in security, and combinations thereof. Process indicates whether procedures and/or policies have clear and enforceable terms, and clearly indicate what to do in case of various events, including attacks. Process also indicates whether training is provided to employees, third party contractors and/or service providers, indicates their level of expertise, and combinations thereof.

Examples of susceptibility elements include: hosting infrastructure; topology; vulnerability scanning; people; and combinations thereof—just to name a few. Hosting infrastructure includes; content distribution networks; shared hosting; cloud providers; etc. Topology includes: accessibility points; page layout; content on site; etc. Vulnerability scanning includes: CVEs (common vulnerabilities and exposures); patching; updating; default passwords; etc. People includes: chief information security officer (CISO); security team; skills; job postings; etc. In this manner, susceptibility encompasses more than just vulnerability, and additionally includes people and processes that may impact a defensive posture of an entity.

Determining these variables may be a data gathering operation, which may be based on public information or a company's own data networks, as discussed herein. A cyber risk assessment, for instance a two by two (or higher order) graph, may be output, along with a composite score, a peer rank, an estimated commercial impact, and recommendations to decrease the cyber risk. These may all be output for each company assessed. All of these elements may be updated over time and in response to implementation of recommendations, thus, transforming the original data via the use of a particular computer.

In some embodiments, the system 505 is configured to evaluate each data point with respect to history, lineage, provenance (e.g., origin), source, time, entities and other details. The system 505 can then cleanse and standardize the data points. Examples of cleansing and standardizing using data normalization are described in greater detail below.

In some embodiments, the system 505 can use a canonical representation of the data points. As mentioned above, the system 505 can track entities and their attributes/elements over time. The system 505 is also configured to process rollups (e.g., summarizing the data along a dimension), aggregations, transforms, reductions, normalizations, deltas, as well as other types of data transformation or conversion processes that can also be used to convert the motivation/susceptibility/combination elements into scores.

The system 505 then generates module-ready data for use with matrices of elements (motivation/susceptibility) for one or more entities. In some embodiments, the system 505 then executes one or more models to generate scores, results, recommendations, delta values (changes in scores over time), as well as historical tracking of scores.

In some embodiments, the system 505 comprises a scoring and plotting module 535 that is generally configured to calculate susceptibility scores, motivation scores, and combination scores; apply weighting to susceptibility and/or motivation elements in various calculations; compare scores to threshold values; benchmark various scores over time; as well as other features described herein.

In a second set of functions, the scoring and plotting module 535 can create visual representations such as the graphs illustrated in FIGS. 6-12.

In one embodiment, the scoring and plotting module 535 is configured to calculate various scores for an entity. In another embodiment the scoring and plotting module 535 can calculate various scores for a plurality of entities. Again, these various scores can be calculated over time and utilized for benchmarking cyber security performance for an entity, or a group of entities that possess a particular attribute in common. For example, the scoring and plotting module 535 can calculate scores for groups of entities in an industry group, a geographical location, a company size, a technology sector, and so forth.

In an example calculation, the scoring and plotting module 535 is configured to calculate a motivation score for one or more entities. The scoring and plotting module 535 obtains motivation elements collected from the various resources and converts this information into a mathematical representation. In one embodiment, a motivation element of pageviews can be mathematically represented by comparing the pageviews of the entity to a set of thresholds. For context, the pageviews could be a pageview of a particular webpage or set of webpages. To be sure, the higher profile and more visited a website is, the more likely that it will be attractive to a hacker, especially if other motivation factors are present such as the entity being involved in commercial activities, just for example.

For purposes of obtaining a coherent scoring scheme, the scoring and plotting module 535 may normalize various elements to obtain mathematical values that are usable in an algorithm for scoring motivation or susceptibility. By way of example, each of the set of thresholds is associated with a mathematical value. If the entity has pageviews in excess of 10,000 unique users in one day, the entity is given a score of five. If the entity has pageviews in excess of 100,000 unique users in one day, the entity is given a score of ten. If the entity has pageviews in excess of 200,000 unique users in one day, the entity is given a score of fifteen. Again, these are merely examples of possible ways to convert pageviews into a mathematical representation that can be combined with other mathematical representations of other motivation elements in order to create an overall motivation score.

In other examples, an employee sentiment can be represented mathematically as a percentage of positive versus negative comments from employees. In another example, negative employee behaviors, actions, or statements can be counted over time and compared to thresholds (in a method similar to that above with respect to pageviews).

Each of the motivation elements (if necessary) is converted into a mathematical representation. The ultimate motivation score can be calculated by taking a sum of each mathematical representation of motivation elements. In some embodiments, the motivation score can be a representation of one or a combination of many motivation elements.

In some embodiments, the system 505 can be configured to weight one or more of the elements in a score calculation. For example, if it is determined that certain elements are more likely to increase the likelihood of a security failure (e.g., a cyber attack, a privacy incident), these elements can be assigned a weight. In an example, the weight is applied by multiplying a mathematical representation of an element by a coefficient or factor. If an element value for pageviews is five, a weighting could include multiplying this number by a coefficient of 0.5, which reduces the impact of that value on the overall score. Increases in element values can also be achieved.

While the above examples reference motivation elements, the scoring and plotting module 535 is also configured to process susceptibility elements to obtain susceptibility scores. The exact details for converting susceptibility/motivation elements into mathematical representations will vary according to the type of information included in the elements. To be sure, some types of elements such as pageviews and revenue are inherently more mathematical in their quantities, while other elements are more non-mathematical in nature such as employee or customer sentiment. For non-mathematical elements, users can develop suitable schemes or algorithms for converting or quantifying these elements into mathematical form.

According to some embodiments, the scoring and plotting module 535 can determine various facets of an entity or group of entities by comparing the motivation, susceptibility, and/or combined scores of these entities. Answers to pertinent questions can be deduced or inferred from the comparison.

For example, in one embodiment, the scoring and plotting module 535 is configured to determine a position of an entity within an aggregate risk score of a portfolio of entities. Thus, the scoring and plotting module 535 has been used to calculate an aggregate risk score (motivation, susceptibility, and/or combined) for numerous entities. In one embodiment, the scoring and plotting module 535 selects a plurality of motivation elements and analyzes these elements for each of a portfolio (plurality) of entities using the above examples as a guide for calculating motivation scores. In some embodiments, the same motivation elements are used for each entity.

The scoring and plotting module 535 can then determine where the entity lies within the group of scores. For example, out of 30 entities, a subject entity places 25th out of thirty.

The scoring and plotting module 535 can also be utilized to generate graphs and GUIs that display various scores in graphical format(s). For example, in FIG. 6, a graph with two axes is illustrated. The graph 600 comprises a vertical axis that is representative of motivation elements, and the horizontal axis is representative of susceptibility elements. Indeed, this graph can be used to display information about a single entity or a plurality of entities.

In one embodiment, the motivation axis is delineated or stratified based on the type of content. Less important types of secure information are located towards the bottom of the axis, whereas more important types of information are located at the top part of the axis. In this embodiment, the lower part of the motivation axis references payment cards (e.g., credit cards) and other types of general consumer information. Above that is online crime such as phishing, malware, and other malicious behavior. Above online crime is IP theft and industrial espionage. At the top of the motivation axis are state secrets. To be sure, other categories of information types will lie somewhere along this axis, if not specifically mentioned. Furthermore, the axis can be defined by other types of information points. For example, an entity can structure their motivation axis to include information that they deal with, structured from least important to most important.

In the susceptibility axis, which is the horizontal axis, hacker profiles are listed from left to right on the axis from a lowest impact actor type to a highest impact actor type. For example, actor types can include casual hackers, professional hackers, organized crime, and state actors. Each of these actor types has a different threat level associated therewith. The susceptibility axis represents the strength or threat level that it takes to successfully hack the subject entity/entities.

Figure 7:
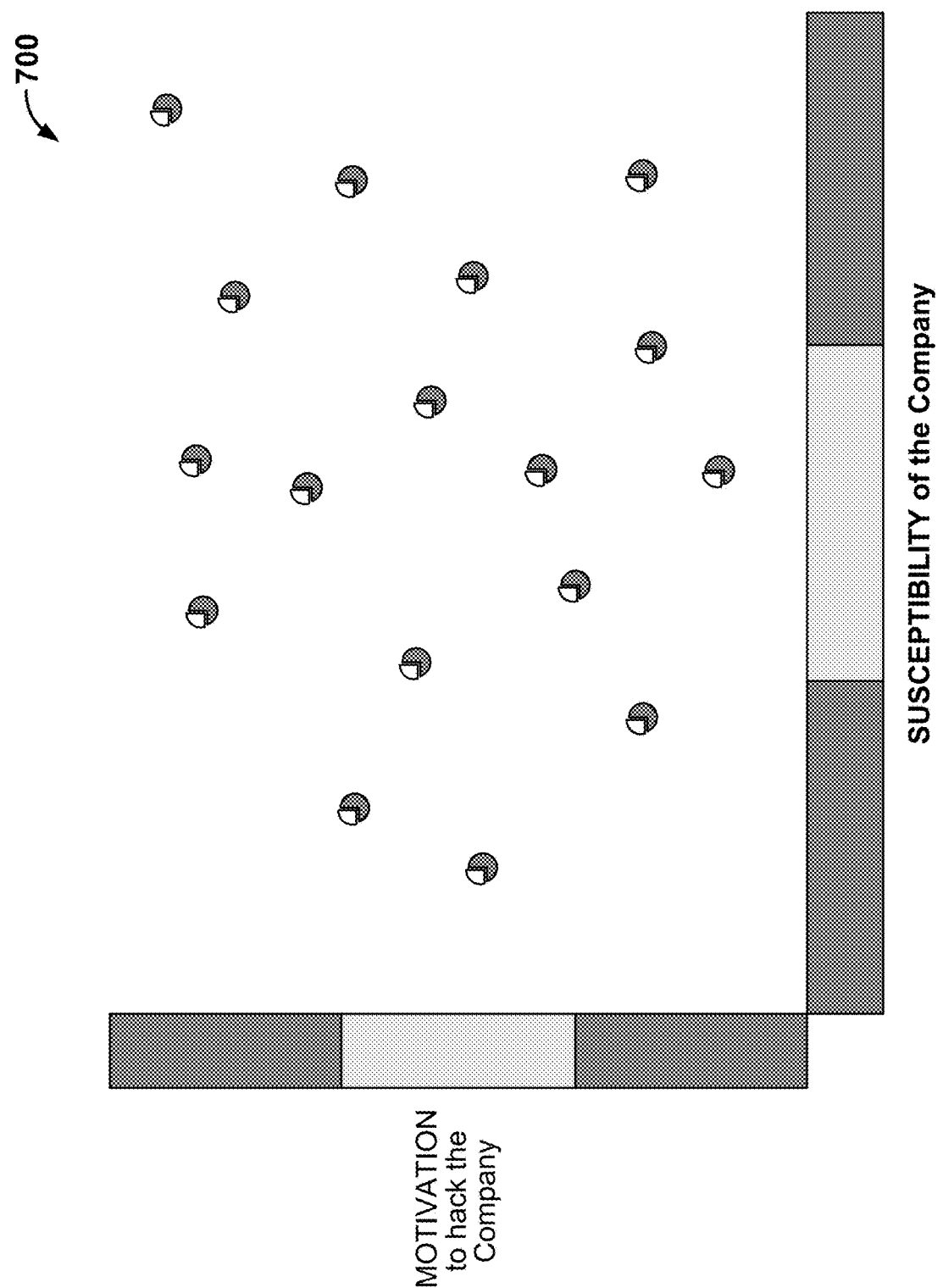
FIG. 7 is an example graphical user interface (GUI) that comprises a scatter plot illustrating an entity's motivation and susceptibility relative to cyber risk.

FIG. 7 is an example graphical user interface (GUI) that comprises scatter plot illustrating an entity's motivation and susceptibility relative to cyber risk. The scatter plot 700 comprises a vertical motivation axis and a horizontal susceptibility axis. Each of the points plotted on the scatter plot 700 represent an entity. Again, these entities can be analyzed together because they are a part of an entity group (e.g., industry group, same geographical location, same company size, etc.).

Figure 8:
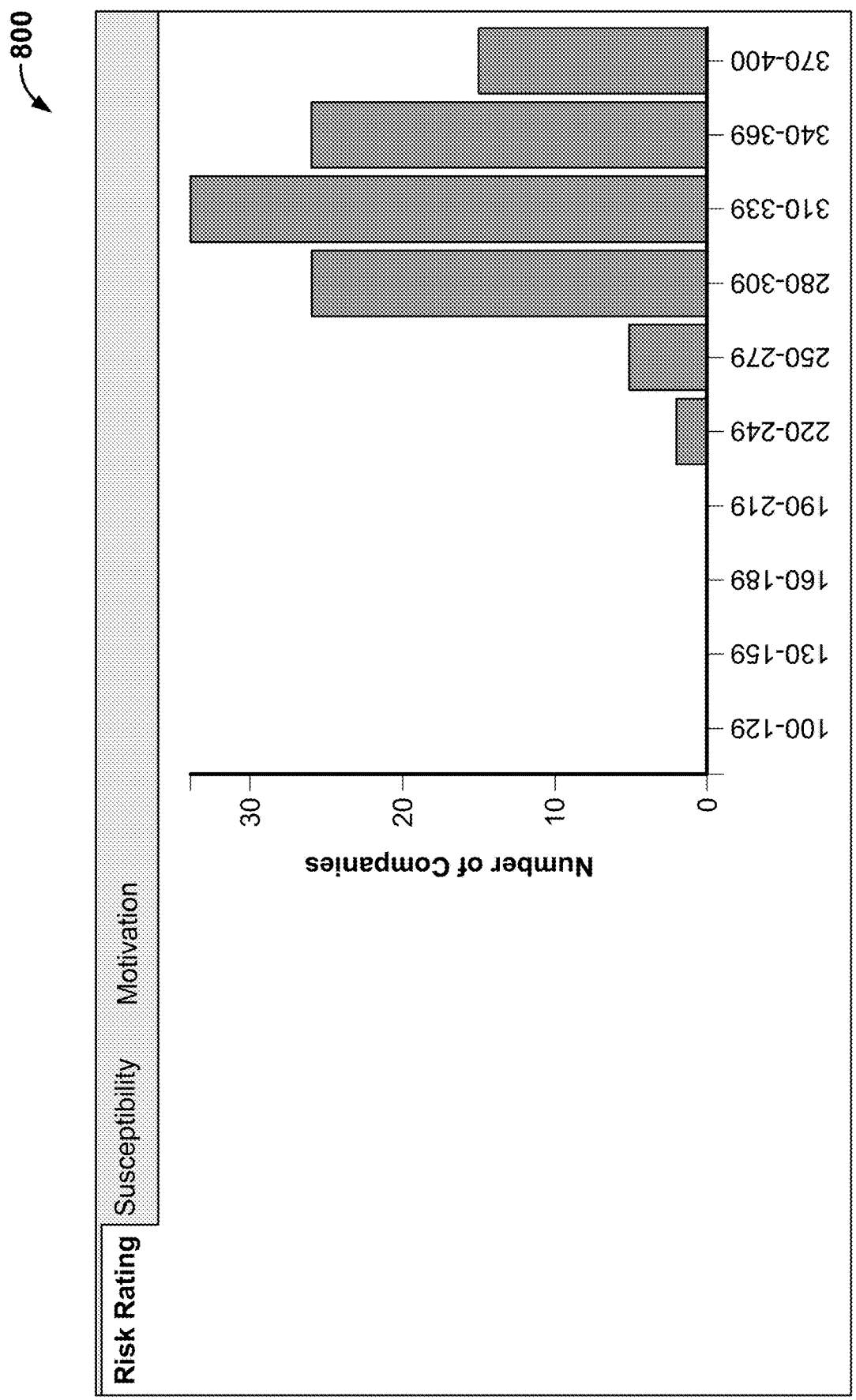
FIG. 8 is an example graphical user interface (GUI) that comprises a bar graph illustrating the plotting of a plurality of entities based on their combination scores.

FIG. 8 is an example graphical user interface (GUI) that comprises a bar graph illustrating the plotting of a plurality of entities based on their combination scores. The bar graph 800 comprises a vertical axis that represents a number of companies and a horizontal axis that represents combination scores for a set of entities. For example, most entities in the group have combination scores (susceptibility and motivation) that fall within a score range of 51-60. Other groups of entities fall within other score ranges.

To be sure the system 505 can cause an elemental analysis of these similar scoring groups to identify what elements are shared between the entities, what elements are different, and so forth. Thus, the graphing of entities based on scores aids the system 505 in identifying groups of entities that require attention. For example, the entities in the score range of 31-40 are severely underperforming.

Figure 9:
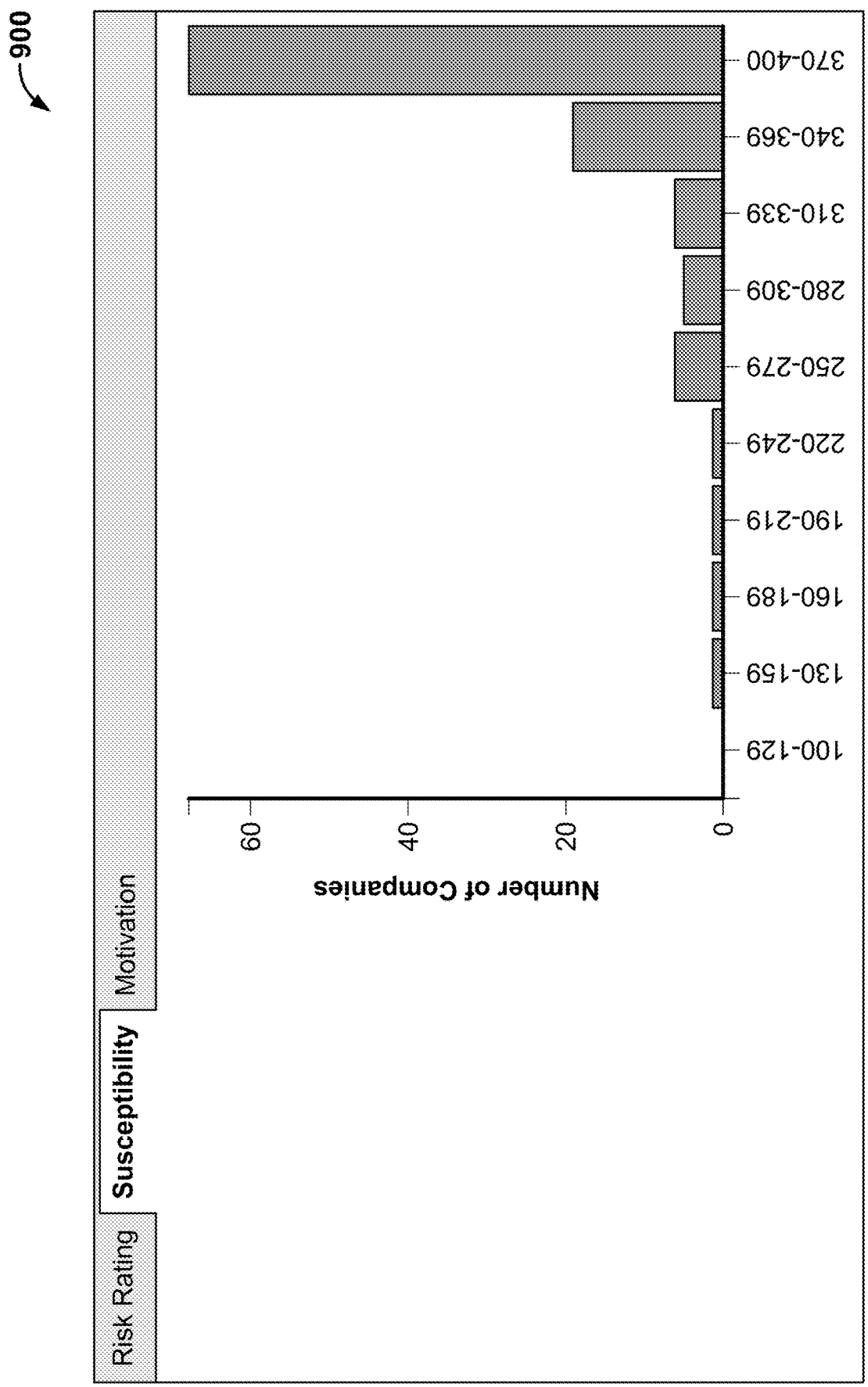
FIG. 9 is an example graphical user interface (GUI) that comprises a bar graph illustrating the plotting of a plurality of entities based on their susceptibility scores.

FIG. 9 is an example graphical user interface (GUI) that comprises a bar graph illustrating the plotting of a plurality of entities based on their susceptibility scores. The bar graph 900 comprises a vertical axis that represents a number of companies and a horizontal axis that represents susceptibility scores for a set of entities.

Figure 10:
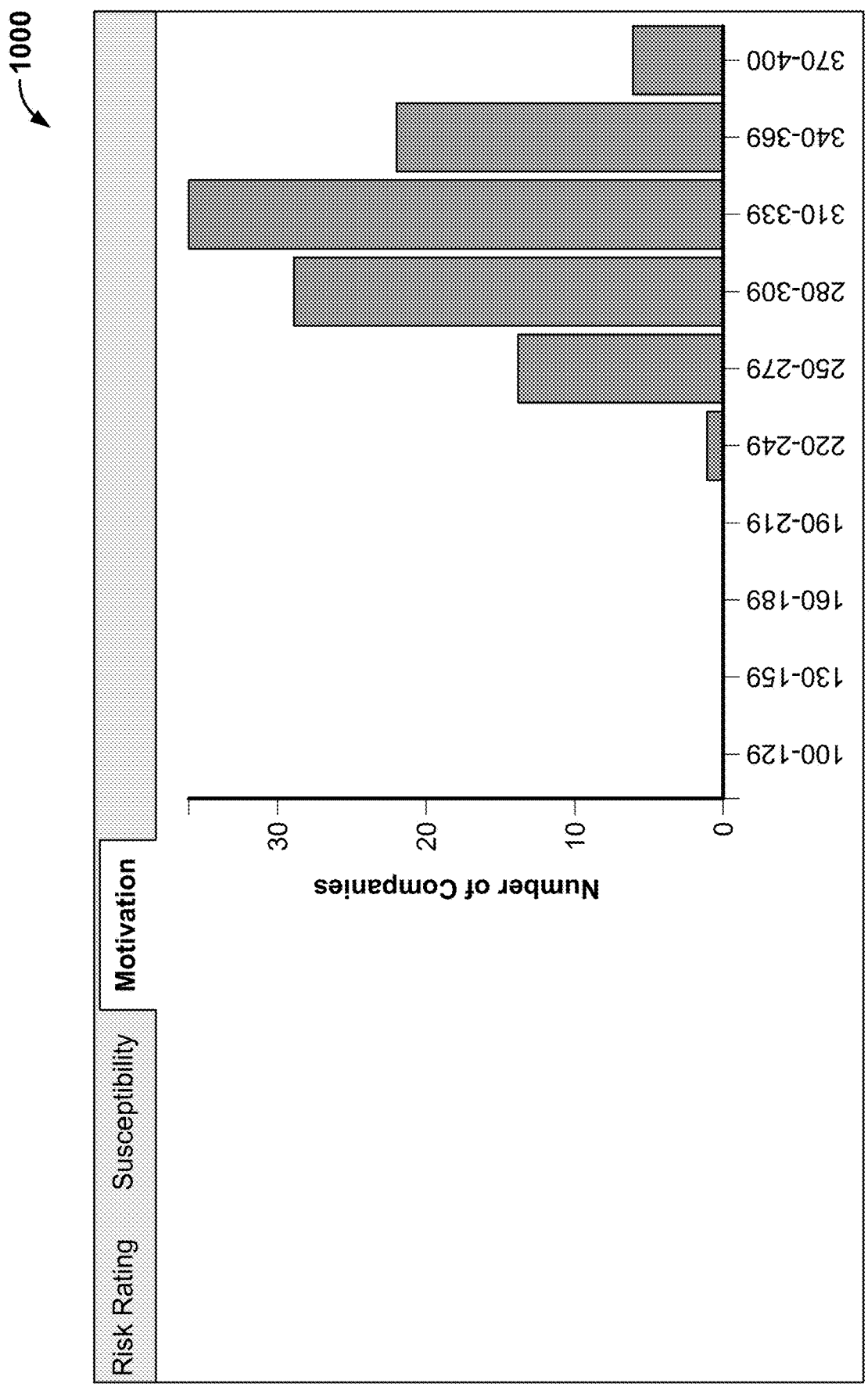
FIG. 10 is an example graphical user interface (GUI) that comprises a bar graph illustrating the plotting of a plurality of entities based on their motivation scores.

FIG. 10 is an example graphical user interface (GUI) that comprises a bar graph illustrating the plotting of a plurality of entities based on their motivation scores. The bar graph 1000 comprises a vertical axis that represents a number of companies and a horizontal axis that represents motivation scores for a set of entities.

By comparing these graphs illustrated in FIGS. 8-10, underperformance in susceptibility and/or motivation can be quickly and easily determined, at least on a high level. Again, a more granular element analysis can be conducted when groups with underperforming susceptibility/motivation scores are identified.

Figure 11:
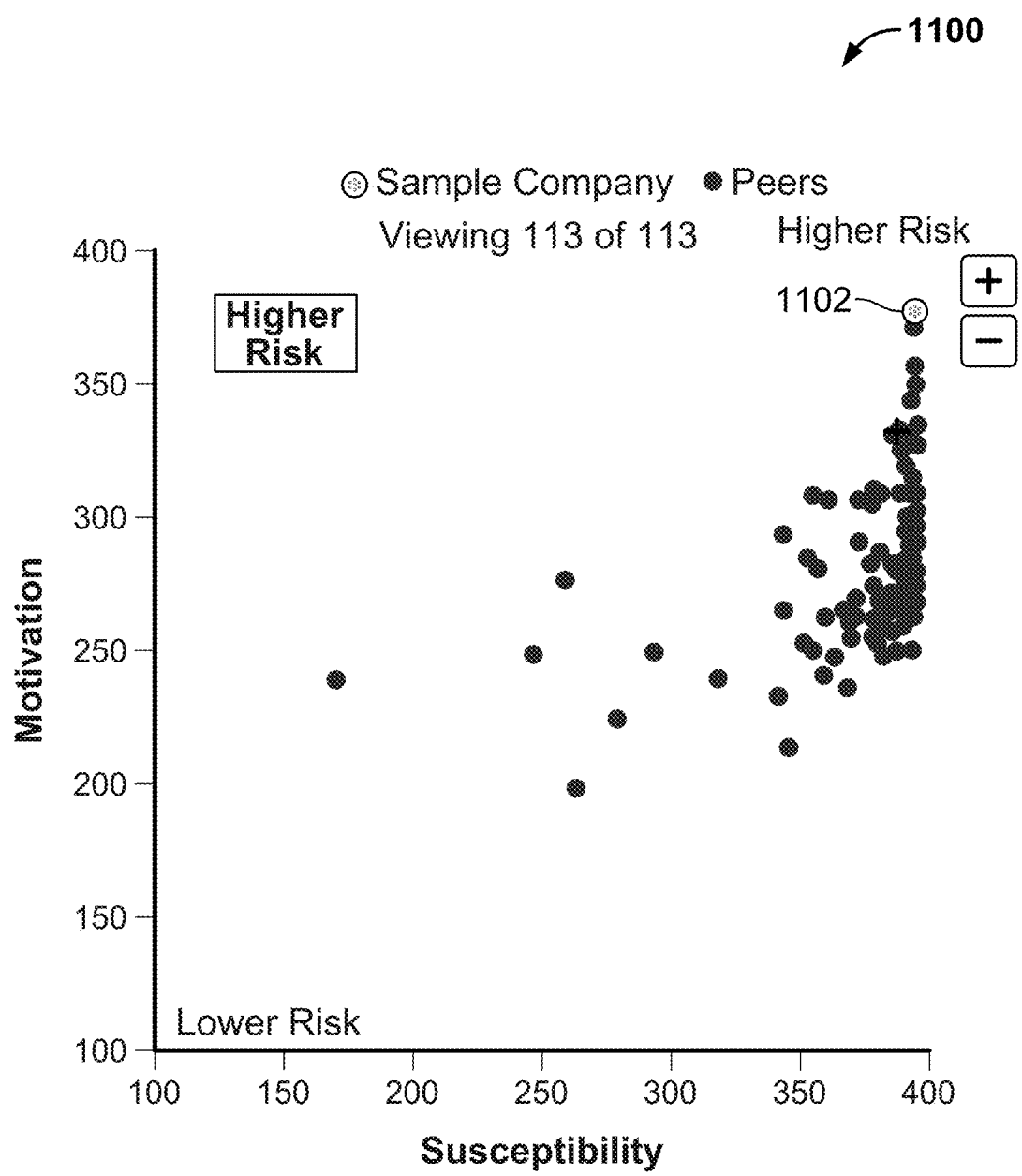
FIG. 11 is an example graphical user interface (GUI) that comprises a scatter plot that represents a plurality of entities plotted according to their combination score.

FIG. 11 is an example graphical user interface (GUI) that comprises a scatter plot that represents a plurality of entities plotted according to their combination score. The scatter plot 1100 includes a plurality of data points that each represents an entity, such as entity 1102. The scatter plot 1100 comprises a vertical axis that represents motivation and a horizontal axis that represents susceptibility scores for a set of entities. The higher risk area on the plot is where the motivation to hack is high and the susceptibility of the entity is low.

FIG. 12 is an example graphical user interface (GUI) 1200 that comprises a peer comparison chart 1200 that comprises peer comparison metrics for an entity compared with a group, such as an industry vertical. In some embodiments, this graph can be displayed along with the scatter plot graph 1100 of FIG. 11. The peer comparison chart 1200 can comprise a risk rating 1205 (based on risk score of 390), a susceptibility rating 1210 (based on susceptibility score of 394), a motivation ranking (based on a motivation score of 377) 1215, and a peer risk rating 1220 (based on a peer risk ranking of 355). An example chart 1225 provides a legend or guide that explains to a user various risk factors that are considered when creating the peer comparison chart 1200, which again can be modeled graphically as in the scatter plot of FIG. 11. The chart 1225 can comprise any number of positive and/or negative risk factors that were considered for the entity. Each factor includes a relative risk assessment for the user. For example, with respect to the use of a CDN, the entity had a better than average CDN risk factor. The risk factors selected will depend on the entity type and the industry or group to which the entity (and all other entities that were analyzed along with the entity in question) belongs.

In response to making a cyber risk assessment, the recommendation module 540 can be executed to provide the end user (or entity) with some type of actionable feedback. For example, the recommendation module 540 can provide the end user one or more actions to the end user based on the diversity score and the clusters of similar variables. This is described in further detail above. These one or more actions potentially decrease the cyber risk of the entity. In one example, the recommendation module 540 can automatically identify variables, which if changed, would affect the cyber risk assessment. In further exemplary embodiments, entities may agree to automatic implementation of recommendations in exchange for lower policy premiums.

As best illustrated in FIG. 12, a set of recommendations 1215 is provided along with the graphical analysis generated for the entity. Again, these recommendations are based on the system 505 having knowledge of the motivation elements, susceptibility elements, as well as the scores calculated not only for the entity, but other entities (in some embodiments).

Exemplary methods and systems according to the present technology may also provide benchmarking over time. In this manner, the system 505 can track, for a company or group or entities, cyber risk over a selectable time period, for example days, weeks, months, and/or years. This benchmarking may be against a dynamic or static evaluation of the peer group, for instance, an entity's past and present cyber risk tracked against a static past peer group, static present peer group, and/or dynamic peer group. The present technology provides information related to the updated information (the new motivation score, the new susceptibility score, the new composite score, etc.), including differences (the amount of the change made in one or more updates, namely the delta), and trends (patterns over many time steps).

Figure 13:
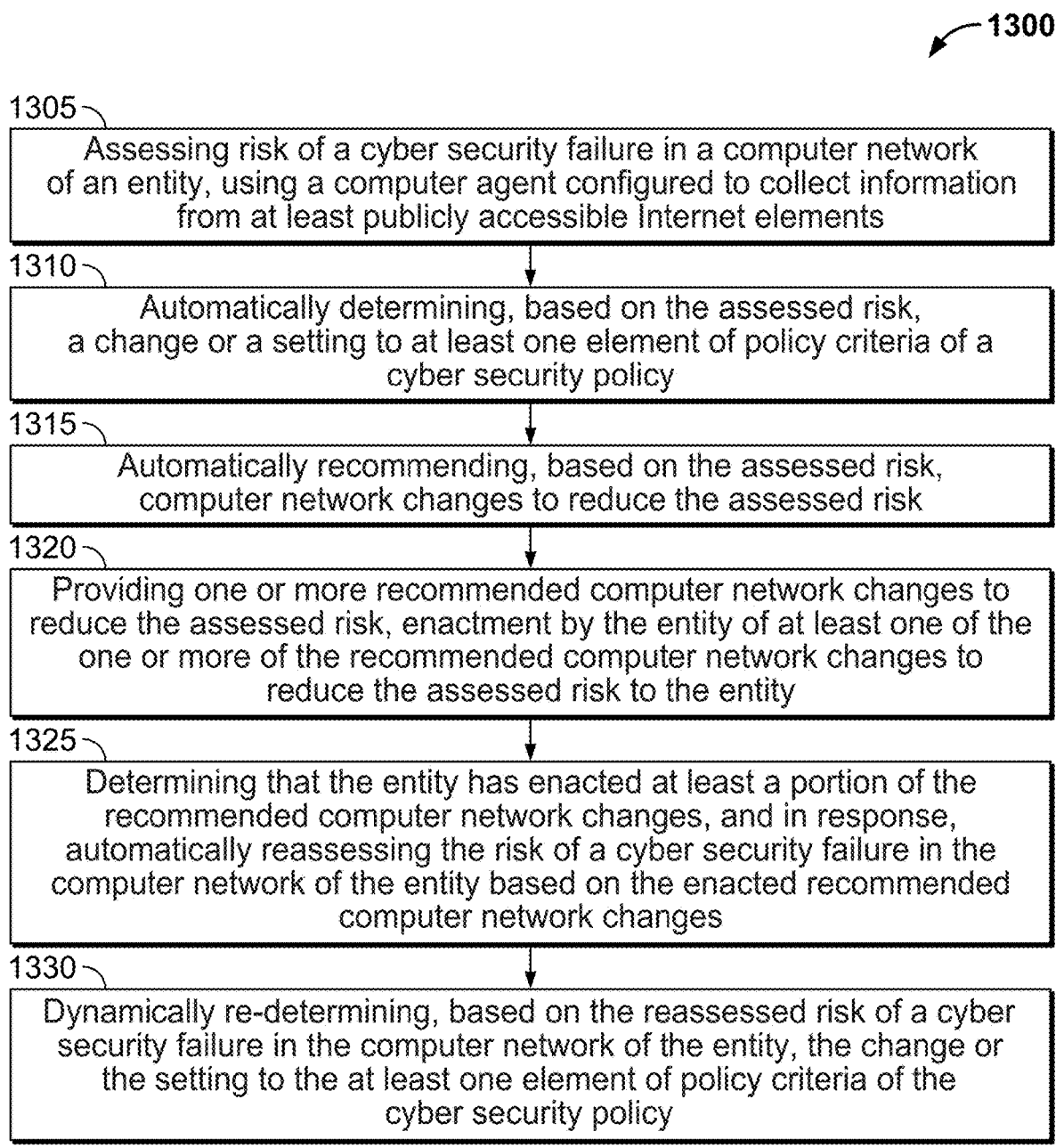
FIG. 13 is a flowchart of an example method of the present technology.

FIG. 13 is a flowchart of an example method 1300 of the present technology. The method 1300 includes the system 505 assessing 1305 risk of a cyber security failure in a computer network of an entity, using a computer agent configured to collect information from at least publicly accessible Internet elements. The cyber risk includes a security failure (e.g., a cyber attack, a privacy incident) of the entity.

The system 505 may query the entity for information, scrape available online sources such as websites, corporate filings, news sources, other public record databases, and other resources. Additionally, data may be gathered from the entity's network using devices already present there or by placing a new data collecting device on the entity's network to gather more data. The data collecting device may be on the company's network and/or its periphery, and may collect and/or analyze the data, while also transmitting it to the system 505. In this example, additional, proprietary data may be gleaned from a particular entity's network.

The exemplary method 1300 also includes the system 505 automatically determining 1310, based on the assessed risk, a change or a setting to at least one element of policy criteria of a cyber security policy. In some embodiments, the at least one element of policy criteria involves a term or condition of a cyber policy. In one embodiment, the cyber security policy includes a cyber security insurance policy.

Next, in this example, the method 1300 includes the system 505 automatically recommending 1315, based on the assessed risk, computer network changes to reduce the assessed risk Next, in this example, the method 1300 includes the system 505 providing 1320 one or more recommended computer network changes to reduce the assessed risk, enactment by the entity of at least one of the one or more of the recommended computer network changes to reduce the assessed risk to the entity.

The exemplary method 1300 also includes the system 505 determining 1325 that the entity has enacted at least a portion of the recommended computer network changes, and in response, automatically reassessing the risk of a cyber security failure in the computer network of the entity based on the enacted recommended computer network changes.

Next, the exemplary method 1300 includes the system 505 dynamically re-determining 1330, based on the reassessed risk of a cyber security failure in the computer network of the entity, the change or the setting to the at least one element of policy criteria of the cyber security policy.

Figure 14:
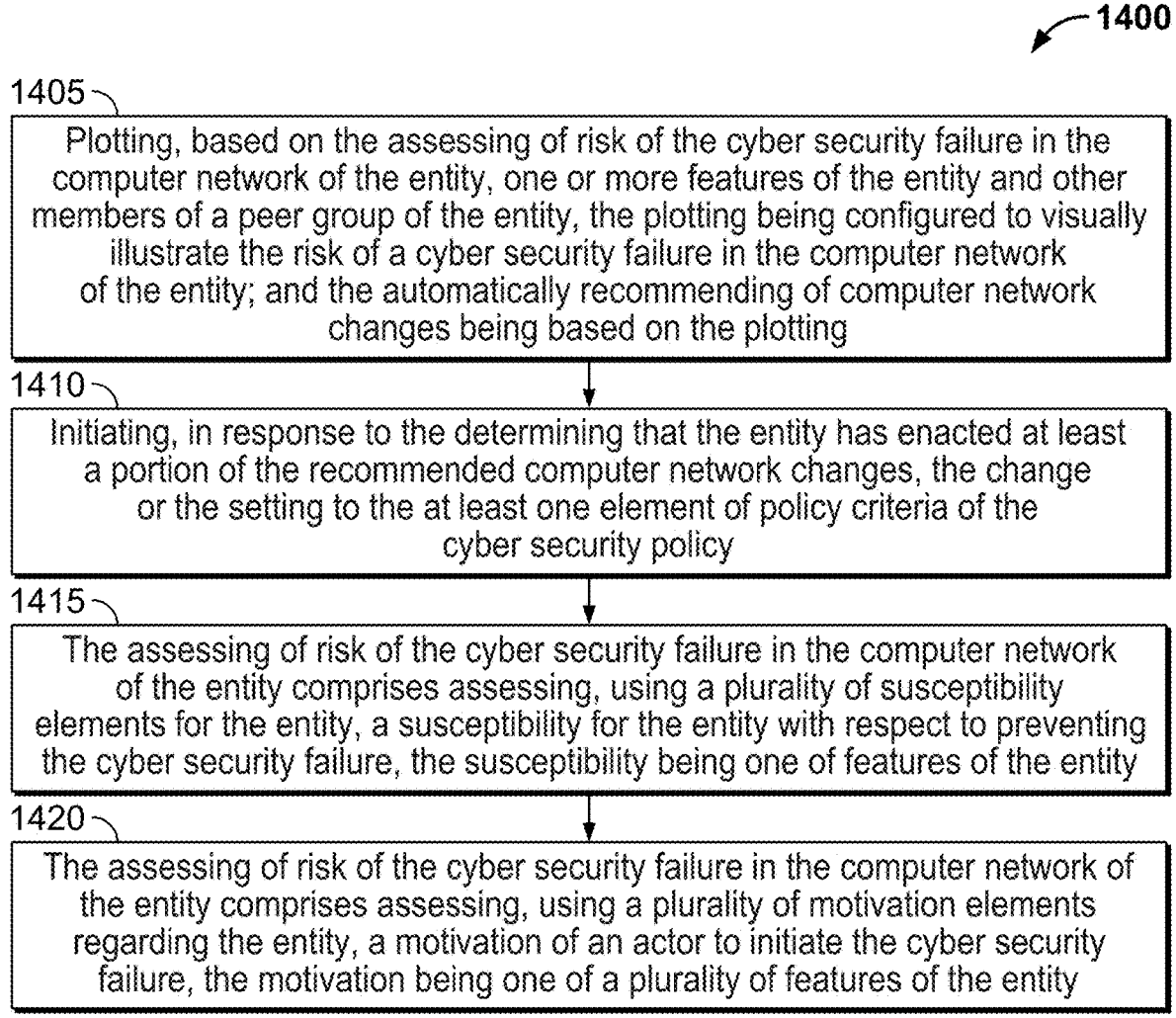
FIG. 14 is a flowchart of another example method of the present technology.

FIG. 14 is a flowchart of an example method 1400. The method 1400 includes the system 505, based on the assessing of risk of the cyber security failure in the computer network of the entity, plotting 1405 one or more features of the entity and other members of a peer group of the entity, the plotting being configured to visually illustrate the risk of a cyber security failure in the computer network of the entity; and the automatically recommending of computer network changes being based on the plotting.

Next, the method 1400 includes the system 505, in response to the determining that the entity has enacted at least a portion of the recommended computer network changes, initiating 1410 the change or the setting to the at least one element of policy criteria of the cyber security policy.

Next, the method 1400 for the assessing of risk of the cyber security failure in the computer network of the entity includes the system 505, using 1415 a plurality of susceptibility elements for the entity, a susceptibility for the entity with respect to preventing the cyber security failure, the susceptibility being one of features of the entity. Again, the susceptibility relates to people, processes, and technology. The susceptibility analysis as a whole attempts to quantify how strong a threat actor would be required to execute a successful security failure of the entity.

Next, the method 1400 for the assessing of risk of the cyber security failure in the computer network of the entity includes the system 505 assessing, using a plurality of motivation elements regarding the entity, a motivation of an actor to initiate the cyber security failure, the motivation being one of a plurality of features of the entity. In some embodiments motivation is a motivation of an actor (e.g., a hacker) to initiate a cyber security failure.

Figure 15:
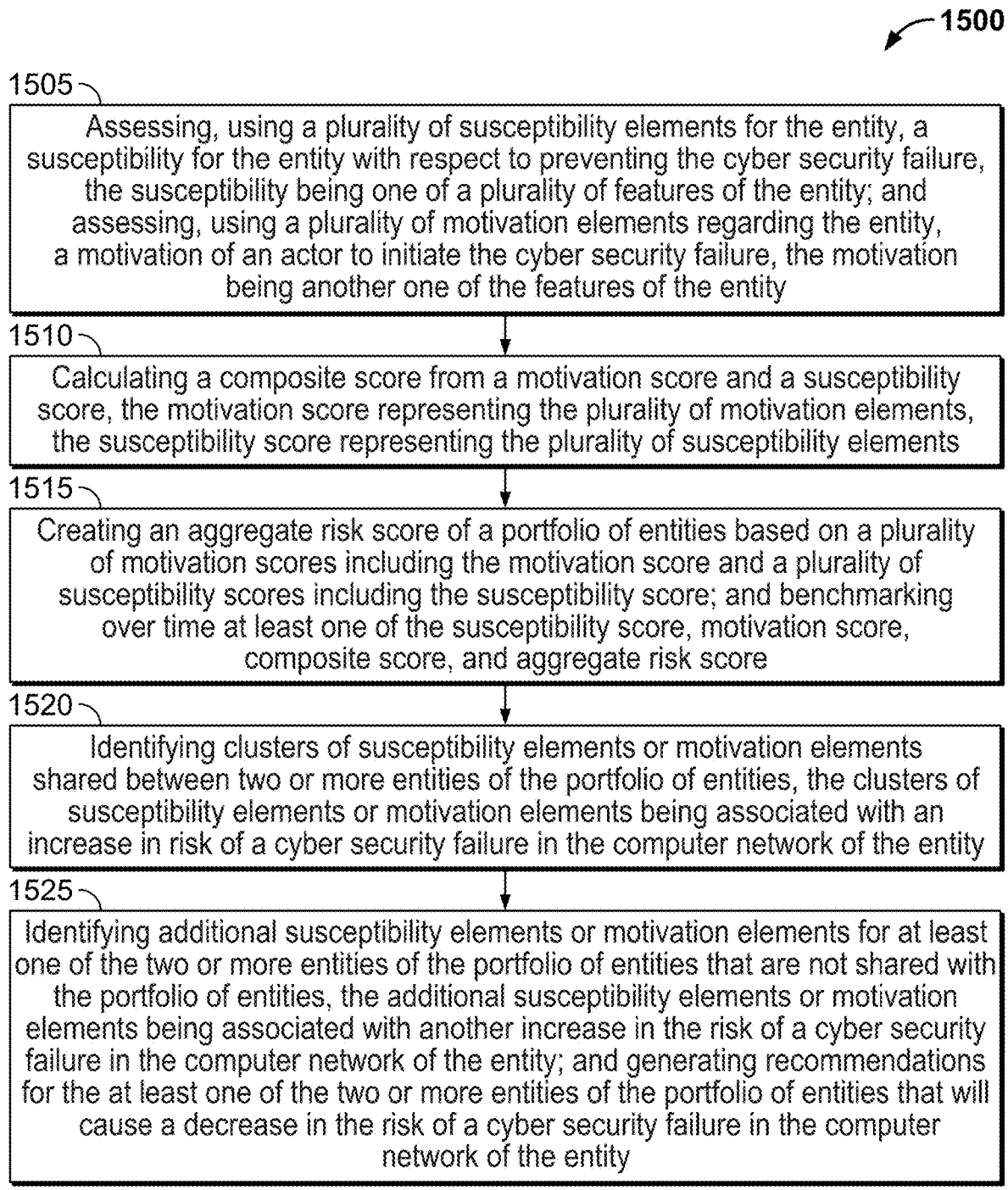
FIG. 15 is a flowchart of yet another example method of the present technology.

FIG. 15 is a flowchart of yet another example method 1500 for modifying a policy based on a cyber risk analysis. The method 1500 includes the system 505 assessing 1505, using a plurality of susceptibility elements for the entity, a susceptibility for the entity with respect to preventing the cyber security failure, the susceptibility being one of a plurality of features of the entity; and assessing, using a plurality of motivation elements regarding the entity, a motivation of an actor to initiate the cyber security failure, the motivation being another one of the features of the entity. Again, the susceptibility relates to people, processes, and technology. The susceptibility analysis as a whole attempts to quantify how strong a threat actor would be required to cause a successful cyber failure.

Next, the method 1500 in various embodiments includes the system 505 calculating 1510 a composite score from a motivation score and a susceptibility score, the motivation score representing the plurality of motivation elements, the susceptibility score representing the plurality of susceptibility elements.

To be sure, steps 1505 and 1510 include the collection of motivation and susceptibility elements, converting these elements into mathematical representations (if needed), and processing these elements into scores using relevant algorithms.

In some embodiments, the method 1500 includes the system 505 creating 1515 an aggregate risk score of a portfolio of entities based on a plurality of motivation scores including the motivation score and a plurality of susceptibility scores including the susceptibility score; and benchmarking over time at least one of the susceptibility score, the motivation score, the composite score, and the aggregate risk score.

Next, the method 1500 in some embodiments includes the system 505 identifying 1520 clusters of susceptibility elements or motivation elements shared between two or more entities of the portfolio of entities, the clusters of susceptibility elements or motivation elements being associated with an increase in risk of a cyber security failure in the computer network of the entity.

Next, the method 1500 in some instances includes the system 505 identifying 1525 additional susceptibility elements or motivation elements for at least one of the two or more entities of the portfolio of entities that are not shared with the portfolio of entities, the additional susceptibility elements or motivation elements being associated with another increase in the risk of a cyber security failure in the computer network of the entity; and generating recommendations for the at least one of the two or more entities of the portfolio of entities that will cause a decrease in the risk of a cyber security failure in the computer network of the entity.

According to some embodiments, the system 505 can be programmed with policy parameters. The system 505 can generate recommendations for the insurer based on the motivation and susceptibility analysis of the entity. In some instances, the recommendation could be to deny a policy or terminate a policy if the entity has motivation or susceptibility elements that are defined by the policy as being unacceptable or uninsurable.

Figure 16:
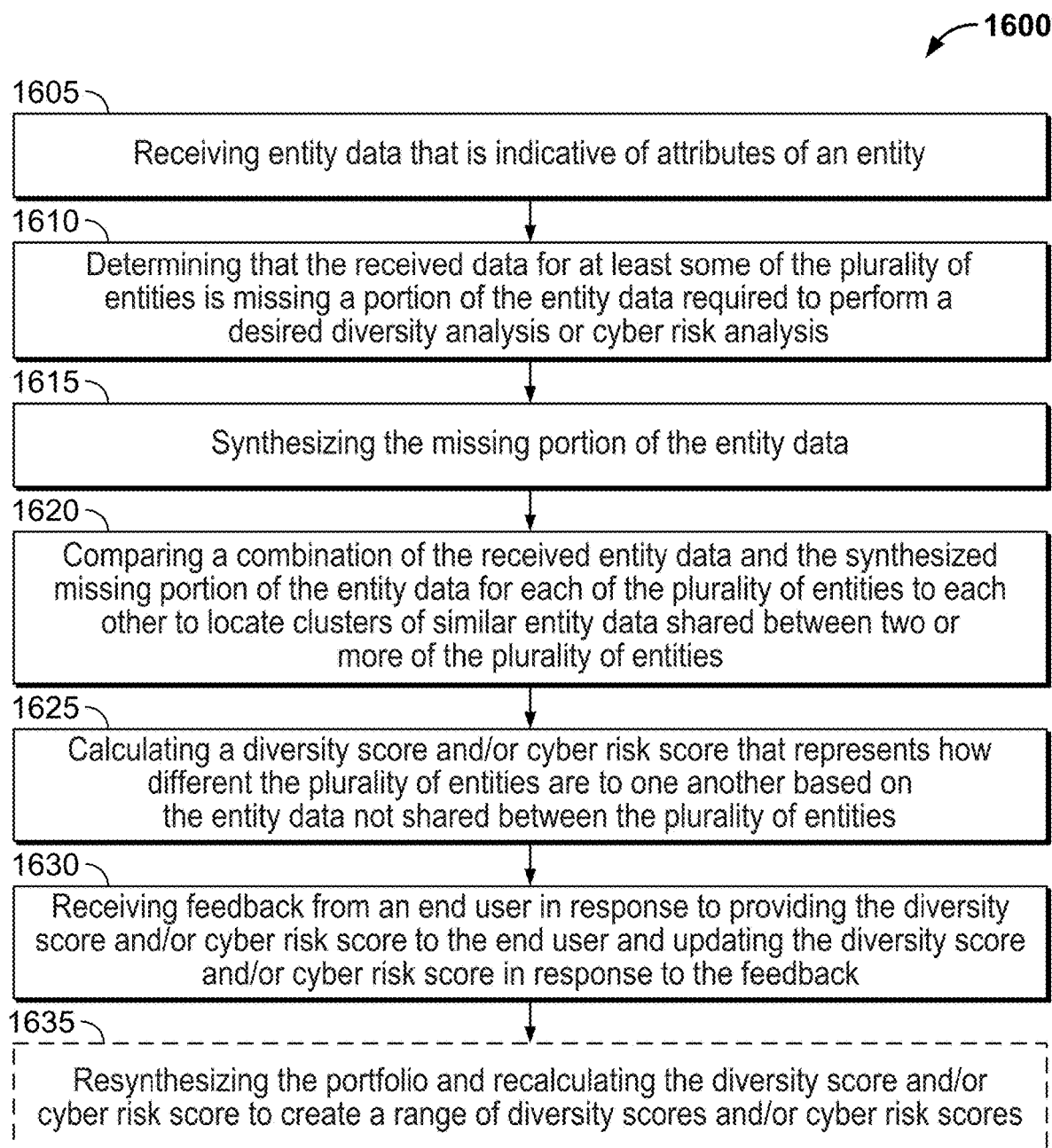
FIG. 16 is a flowchart of an example method of portfolio synthesis for cyber risk analysis.
Figure 17:
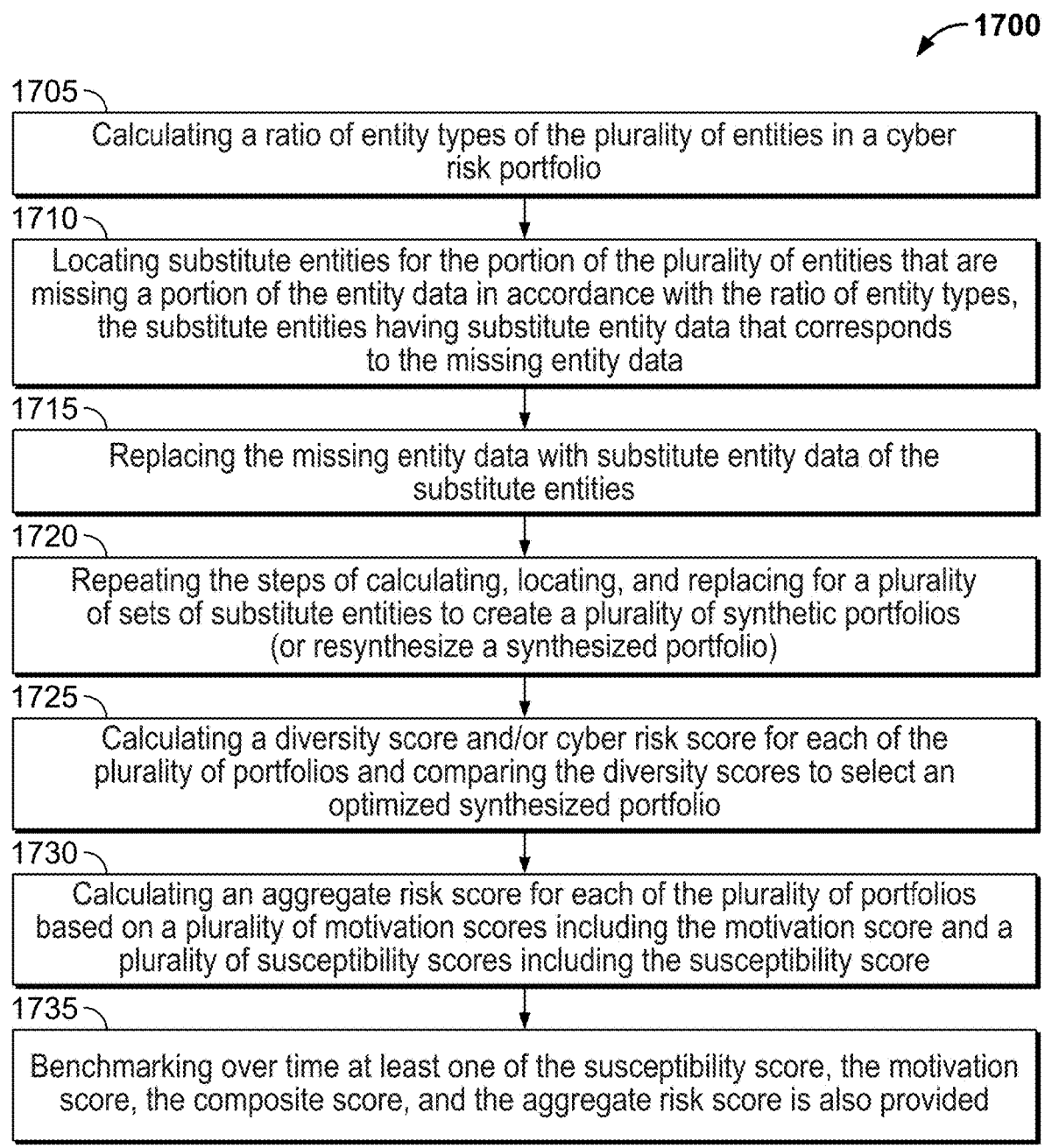
FIG. 17 is a flowchart of an example synthesis method for use in accordance with the present disclosure.

Referring collectively to FIGS. 16 and 17 that illustrate and disclose methods and systems for exemplary synthetic portfolio analyses. These methods and systems can allow for diversity analyses determinations (as well as related processes) when entity data is incomplete or unavailable. In various embodiments, these determinations are associated with what is referred to as synthetic portfolios. When entity data is complete or nearly complete for each entity within a cyber risk group (as disclosed above), the systems and methods herein can be used for a direct diversity analysis. For example, when considering the cyber risk of a pool of 100 entities (such as 100 companies) and data is readily obtainable for all of these entities, cyber risk is readily calculable and diversity analysis can be performed.

When relevant cyber risk data is missing for a portion of the entities and/or relevant cyber risk data is incomplete for one or more of the entities, the following methods can be used to synthesize relevant data used to fill in the gaps when performing a cyber risk data analysis. In one embodiment, it is assumed that, in a given cyber risk portfolio, a known number of entities has a sufficient amount of entity data to perform a cyber risk analysis, although the portfolio is missing additional entity data for a subset of entities in the cyber risk portfolio. Entity data for these entities with missing data can be inferred/substituted from other similar cyber risk portfolios having similar entities. The entities selected from other cyber risk portfolios can be based on a known diversity within the cyber risk portfolio. For example, if the cyber risk portfolio has a total of 500 entities, but is missing data for 30% of the entities, an entity type analysis can be performed to determine groupings of entities in the cyber risk portfolio on a percentage basis. By analyzing an entity type of each of the 350 entities for which entity data exists, it may be determined that 50% are retail, 30% are healthcare, and 20% are payment services. It can then be inferred that the same ratio of entity data should be substituted for entities with missing entity (either partial or total) data, according to various embodiments. This is generally referred to as an intrinsic type of analysis as it relies upon known quantities and/or qualities of the cyber risk portfolio.

In certain embodiments, entity data can be obtained from other similar cyber risk portfolios, such as cyber risk portfolios with similar ratios of entities. In another embodiment, substitute entity data can be obtained from entities that have similar attributes to entities with missing data. By way of example, if it is determine that an entity has missing entity data, such as a total number of full time employees, but it is known that the entity is in the healthcare space and that the entity has gross revenue of $4,000,000 per year, the systems and methods can explore other entities with similar known data who have available full time employee data. If 20 other similar entities are located, each of the entities can be substituted in place of the entity having missing entity data. A plurality of cyber risk scores can be calculated for each permutation of entities (e.g., when one entity that matches is substituted into the portfolio).

In some embodiments, the systems and methods can perform a plurality of cyber risk diversity analyses over various permutations of synthetic diversity portfolios to determine a range of diversity scores. For example, if the cyber risk portfolio comprised 20 entities that had indeterminate entity data and 120 replacement or substitute entities are located, the systems of the present disclosure can select groups of 20 substitute entities of the 120 substitute entities to include in the cyber risk portfolio. These groups of 20 substitute entities can include any subset of the 120 selected at random or otherwise. By way of example, if the 120 substitute entities are subdivided into six groups of 20 substitute entities, six different cyber risk diversity analyses can be performed.

Referring now to FIG. 16, which illustrates a flowchart 1600 for an exemplary method for synthetic portfolio creation and analysis. Additional details regarding the execution of a diversity analysis within a cyber risk pool are provided supra, as well as methods for performing a cyber risk analysis. A user desires to determine a diversity of a cyber risk portfolio or alternatively perform a cyber risk analysis. As mentioned above, the portfolio is missing a portion of entity data for one or more entities in the portfolio that is necessary for performing a diversity analysis and/or calculating other risk assessment scores. For example, if 15 attributes of entity data are required for each of the entities in a portfolio to perform a desired analysis for the portfolio, and one or more of the entities is missing all or part of the 15 attributes, the synthesis process can be executed to locate suitable replacement entity data. For example, if an entity is missing 9 of the 15 attributes needed, and another entity is missing all the 15 attributes needed, various methods can be performed to locate suitable replacement or substitute entity data.

As an aside, while examples herein contemplate an entity as a business or company, the present disclosure is not so limited. Thus, a portfolio can comprise any group of entities, including companies, people, parties, and so forth.

In order to compensate for missing entity data (of varying degrees), the method in the example in FIG. 16 can include a step 1605 of receiving entity data that is indicative of attributes of an entity. This step may be executed for each of a plurality of entities in a portfolio. Next, the exemplary method includes a step 1610 of determining that the received data for at least some of the plurality of entities is missing a portion of the entity data that is required to perform the desired diversity analysis or cyber risk analysis. This can include parsing and evaluating the records of each entity to determine if any of the required entity data used to perform a diversity analysis or a cyber risk analysis is missing. To be sure, the entity data used to perform a diversity analysis or cyber risk analysis can include any desired permutation of entity data (e.g., attributes) but can be tailored to the desires of the cyber risk manager (or other user).

Generally, this process evaluates joint risk characteristics and environmental factors in order to fill in any missing information.

In some embodiments, once the missing entity data has been identified, the exemplary method includes a step 1615 of synthesizing the missing portion of the entity data. There are a number of different options for how data is synthesized for the portfolio. In one embodiment, a remainder of the portfolio (e.g., entities with complete or nearly complete entity data) is used as a baseline for synthesizing entity data. In another embodiment, synthesized entity data can be obtained from other portfolios or from behavior or usage patterns of the portfolio owner/manager.

Again, existing entities in a portfolio can be evaluated. For example, the system can consider what the entities (or specifically the entity with missing entity data) normally does in its business practices. The system can also consider common types of entities that user normally includes in its portfolio.

Typically, when the system has its required entity data for entities in the portfolio, a match is performed to find identification off of existing set of entities in the portfolio.

If this is impossible due to lack of any complete entity records (e.g., no entity in the portfolio has necessary entity data), then the system can correlate and locate entities that are similar based on existing criteria, user behavior, or global behavior (for example, behavior of others globally, outside the portfolio, who also target markets that the entity targets). Global behaviors may include any external factors (including what users view, things users are concerned about, what other people are concerned about, global market transactions, outside news, financial news, and so forth—just to name a few.

In another embodiment, a basis for synthesizing entity data can be determined by examining user data such as user logs (e.g., history or behavioral information). For example, if the portfolio owner/administrator examines a vulnerability profile frequently, the systems and methods will locate similar companies based on their vulnerability profile (if available). The systems and methods attempt to correlate vulnerability profiles between known entities in other portfolios with the know information gathered for entities in the portfolio that require synthesis.

In some embodiments, a vulnerability profile may comprise various types of factors, including the type of companies, its operations, and including but not limited to its networks, just as examples.

In essence, these processes can allow for reverse engineering of a synthesized portfolio based on a normal course of practice for similar portfolios/entities (e.g., what is commonly considered in similar portfolios), such as midlevel retailers and healthcare. The systems and methods can mimic a loss of another portfolio by sampling and substituting entities into an incomplete portfolio and calculating diversity scores and/or risk scores as disclosed herein to determine to match the losses of the portfolios.

In various embodiments, once the synthesis has been performed (e.g., a synthetic portfolio of entities has been created), a diversity analysis or cyber risk analysis can be performed. Thus, the exemplary method includes a step 1620 of comparing a combination of the received entity data and the synthesizing missing portion of the entity data for reach of the plurality of entities to each other to locate clusters of similar entity data shared between two or more of the plurality of entities.

Next, the exemplary method includes a step 1625 of calculating a cyber risk score that represents how different the plurality of entities are to one another based on entity data that are not shared between the plurality of entities.

In some embodiments, the exemplary method includes a step 1630 of receiving feedback from an end user in response to providing the cyber risk analysis to the end user and updating the cyber risk score in response to the feedback. As mentioned above, the method can also include a step 1635 of resynthesizing the portfolio and recalculating the cyber risk score to create a range of scores. For example, the entities and/or missing entity data which were substituted to create the synthetic portfolio are replaced (partially or entirely) with different substitute entities. Thus, a range of diversity scores is created using a set of synthesized and/or resynthesized portfolios.

According to some embodiments, the portfolios can be periodically and/or continually reevaluated to determine how the cyber risk scores of a portfolio change over time. This process is indicative of how a cyber risk of the portfolio changes/evolves over time. In one embodiment, changes in a composition of a portfolio can occur automatically as changes in similar portfolios are identified. For example, if the system determines that other similar portfolios are insuring more of a particular type(s) of entities, the system can automatically recompose the portfolio to include additional types of entities. By way of example, if other similar portfolios have increased a percentage of retail companies from 40 to 50 percent overall, the system can automatically remove entities that are not retail companies and replace them with retail companies so that the overall ratio of retail companies in the portfolio are approximately 50 percent of the overall portfolio.

In sum, various embodiments of the present disclosure contemplate use of feedback from not just a user, but also a global environment and other companies that are included both within the portfolio (intrinsic) and other portfolios (external).

The portfolio resynthesize methods described herein can allow for conceptual portfolios to compare to an existing portfolio, using the existing portfolio as a baseline for diversity and/or risk scoring.

While the aforementioned methods are described for use in determining or assessing cyber risk for a portfolio of entities (including synthesized portfolios), the present disclosure is not so limited. For example, the principles disclosed herein for portfolio synthesis can be used for evaluating mutual funds (e.g., 3% rate of return). The systems and methods can generate multiple combinations of different stocks and see what those projected rates are and sample them randomly. In addition to evaluating stocks for companies with complete entity data, the methods herein can be extended to evaluating companies for which incomplete entity data exists. In another example use case, the features of the present disclosure can be implemented to allow a user to prospect for businesses for commercial purposes such as business acquisition or venture funding. In some embodiments, the systems and methods herein provide the user with companies having a "diversity profile" that is either similar to a company that they are interested in, or it could recommend a business with a profile that allows them to diversify the risk of their current investment portfolio. For example, if the user is a real estate investor, the user can obtain diversity profiles for investments that are complementary to their current investment portfolio, or suggestions/recommendations can be provided to diversify the investment portfolio by having the user invest in other opportunities or companies that balance risks when combined with real estate portfolio investments.

In sum, various embodiments of the present disclosure allow for portfolio synthesis over any pool of entities with incomplete information and to assign both a risk rating and a relative risk rating, as well as diversity score. The process can also recommend action such as where there is potential over aggregation, whether they should invest in it or not. In instances where the investment is not suggested, the systems can identify alternatives and suggest a different group of entities with a different rating.

FIG. 17 illustrates a flowchart 1700 of an example method for synthesizing a portion of data missing for entities in a portfolio. The method may include a step 1705 of calculating a ratio of entity types of the plurality of entities in a cyber risk portfolio. For example, a ratio of a portfolio could include 50% technology, 30% retail, 10% healthcare, and 10% logistics. The overall portfolio includes 500 entities, but data is missing or incomplete for 150 of the entities.

Thus, the method can comprise a step 1710 of locating substitute entities for the portion of the plurality of entities that are missing a portion of the entity data in accordance with the ratio of entity types. For example, the system can look for portfolios with similar ratios that have complete entity records. If no corresponding portfolios are found, individual complete records for entities that correspond to the desired entity types can be located.

These entities are generally referred substitute entities and these substitute entities have substitute entity data that corresponds to the missing entity data.

Next, the method may include a step 1715 of replacing the missing entity data with substitute entity data of the substitute entities. This can include replacing the incomplete entity records entirely, or inferring/deducing missing data for the incomplete entity records while using the remaining entity data in the incomplete records.

In some embodiments, the method includes a step 1720 of repeating the steps of calculating, locating, and replacing for a plurality of sets of substitute entities to create a plurality of portfolios.

According to some embodiments, the method includes a step 1725 of calculating a diversity score and/or cyber risk score for each of the plurality of portfolios. It will be understood that the diversity score represents how dissimilar the plurality of entities in each of the plurality of portfolios are relative to one another in view of their collective entity data. This step can serve as the basis for determining which synthesized portfolio is best for the user.

In some embodiments, the method includes a step 1730 of calculating an aggregate risk score for each of the plurality of portfolios (e.g., synthesized and resynthesized portfolios) based on a plurality of motivation scores including the motivation score and a plurality of susceptibility scores including the susceptibility score. A step 1735 of benchmarking over time at least one of the susceptibility score, the motivation score, the composite score, and the aggregate risk score is also provided.

Figure 18:
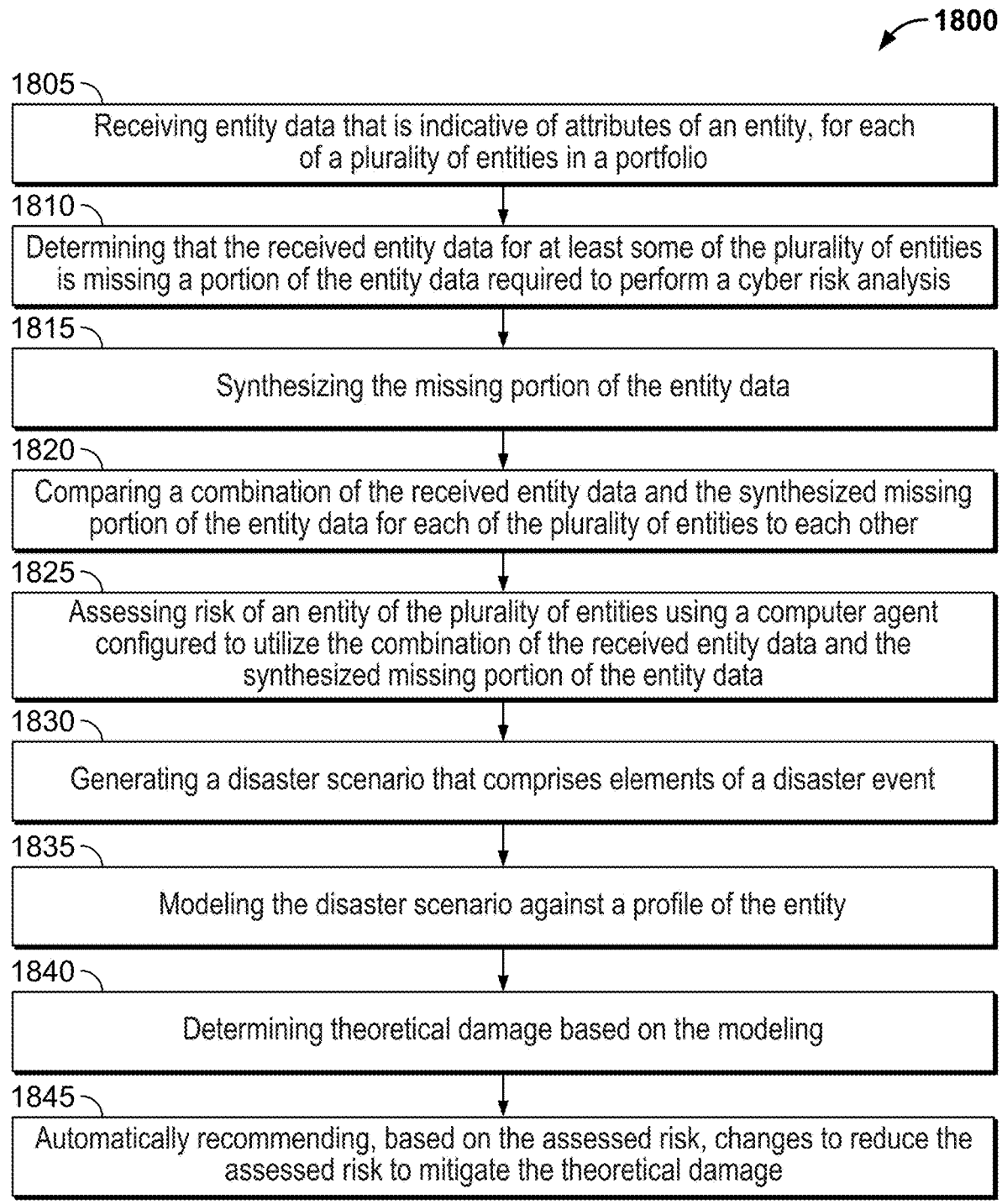
FIG. 18 is a flowchart of an example synthesis method in combination with a disaster modeling scenario method.

FIG. 18 is a flowchart of an example method 1800 of the present disclosure. In one embodiment the method 1800 comprises a step 1805 of receiving entity data that is indicative of attributes of an entity, for each of a plurality of entities in a portfolio. Next a step 1810 is executed for determining that the received entity data for at least some of the plurality of entities is missing a portion of the entity data that is required to perform a cyber risk analysis.

In one or more embodiments, the method 1800 comprises a step 1815 of synthesizing the missing portion of the entity data and a step 1820 of comparing a combination of the received entity data and the synthesized missing portion of the entity data for each of the plurality of entities to each other.

In some embodiments, the method 1800 can involve the assessment of cyber risk using a disaster scenario modeling sub-method. This can include a step 1825 of assessing risk of an entity of the plurality of entities using a computer agent configured to utilize the combination of the received entity data and the synthesized missing portion of the entity data. In some embodiments, the assessing of risk comprises at least a step 1830 of generating a disaster scenario that comprises elements of a disaster event, a step 1835 of modeling the disaster scenario against a profile of the entity, and also a step 1840 of determining theoretical damage based on the modeling.

According to some embodiments, the method 1800 may also optionally comprise a step 1845 of automatically recommending, based on the assessed risk, changes to reduce the assessed risk to mitigate the theoretical damage.

Additional examples of disaster-based scenario modeling can be found in Applicant's co-pending application U.S. Ser. No. 15/374,212, filed on Dec. 9, 2016, entitled "Disaster Scenario Based Inferential Analysis Using Feedback for Extracting and Combining Cyber Risk Information", which is hereby incorporated by reference herein in its entirety including all references and appendices cited therein.

Figure 19:
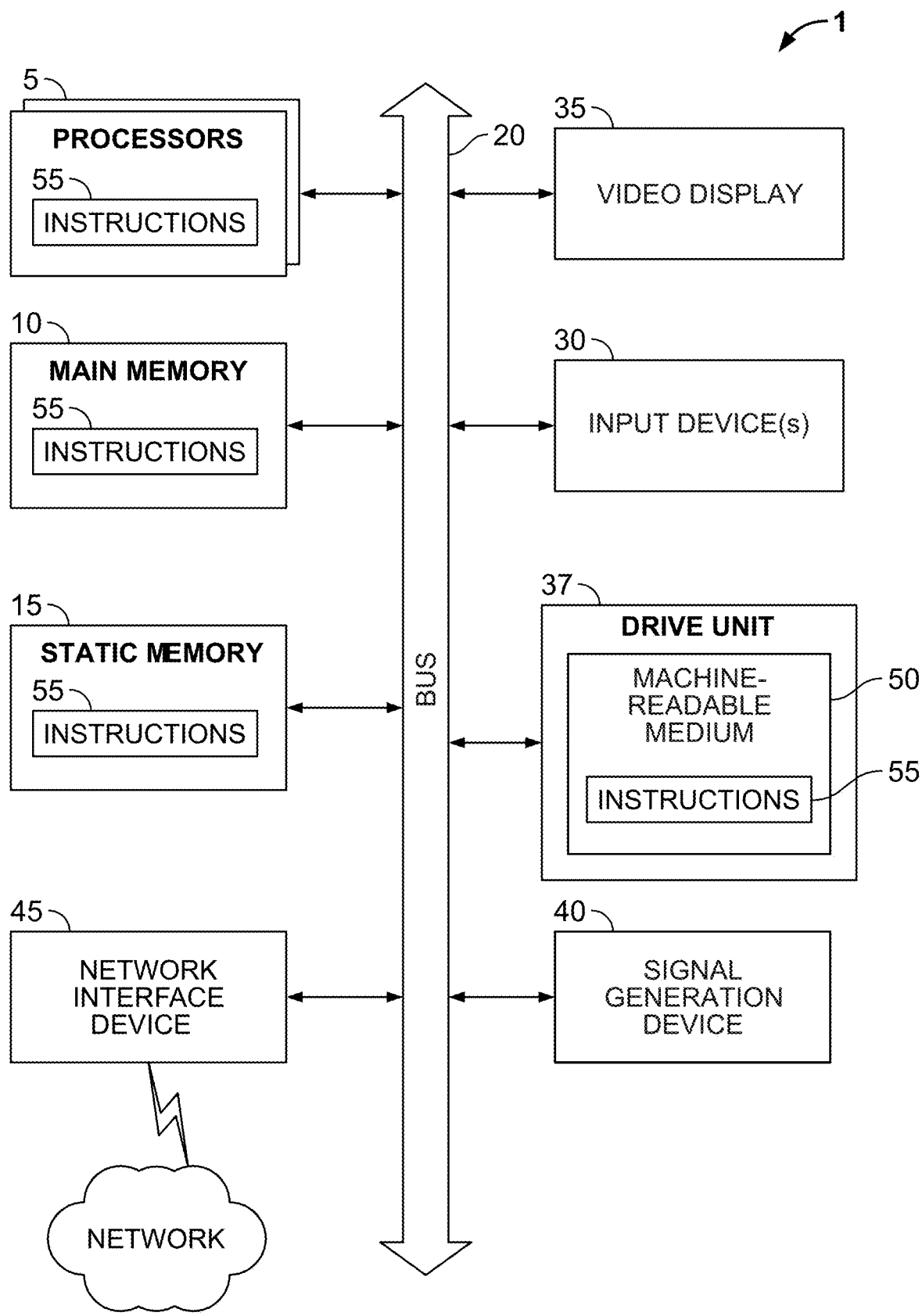
FIG. 19 is a schematic diagram of a computing system that is used to implement embodiments according to the present technology.

FIG. 19 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network (e.g., network 105B or network 520, see FIG. 1 and FIG. 5, respectively) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method, comprising:
    determining, by a processor, that a portfolio comprising a plurality of entities is missing a portion of entity data for at least some entities in the portfolio, wherein the entity data is indicative of entity attributes;
    synthesizing the missing portion of the entity data at least in part by:
        determining a ratio of entity types of the plurality of entities in the portfolio at least in part by determining groupings of entities in the portfolio on a percentage basis;
        locating one or more substitute entities that have substitute entity data that corresponds to the missing portion of the entity data at least in part by determining, based at least in part on the determined ratio of entity types, portfolios with similar ratios that have complete entity records; and
        replacing the missing portion of the entity data with substitute entity data of the one or more located substitute entities;
    locating clusters of similar entity data shared between two or more of the plurality of entities at least in part by comparing, by the processor, a combination of the entity data and the synthesized missing portion of the entity data for each of the plurality of entities to each other;
    assessing a likelihood of a cyber security failure in a computer network of an entity of the plurality of entities based at least in part on the combination of the entity data and the substitute entity data; and
    based at least in part on the assessing of the likelihood of the cyber security failure in the computer network of the entity, determining a set of computer network changes to reduce the likelihood of the cyber security failure in the computer network of the entity, the set of computer network changes comprising at least one of a change in a content delivery network (CDN) provider or a change in a cloud service provider.

2. The method of claim 1, wherein the synthesizing of the missing portion of entity data comprises:
    comparing the plurality of entities of the portfolio that is missing a portion of the entity data to entities with complete entity data; and
    generating a synthesized portfolio, the generating comprising:
        selecting the entities with complete entity data;
        based at least in part on the comparison of the plurality of entities of the portfolio that is missing a portion of the entity data to entities with complete entity data, replacing the plurality of entities that is missing a portion of the entity data with the selected entities with complete entity data; and
        wherein the entities with complete entity data are within additional portfolios that are similar in entity composition to the synthesized portfolio.

3. The method of claim 2, further comprising substituting entity data, from the selected entities having the complete entity data, for the portion of the entity data that is missing, such that a likelihood of a cyber security failure for the synthesized portfolio mimics a likelihood of a cyber security failure of other similar portfolios.

4. The method of claim 2, further comprising based on the synthesized portfolio, generating another synthesized portfolio and calculating a diversity score.

5. The method of claim 4, further comprising creating, based at least in part on a set of resynthesized portfolios, a range of diversity scores.

6. The method of claim 1, further comprising automatically recommending, based on the assessed likelihood of cyber security failure, at least some of the determined set of computer network changes.

* * * * *